United States Patent
Kosaki

(10) Patent No.: US 9,305,222 B2
(45) Date of Patent: Apr. 5, 2016

(54) IMAGE PROCESSING APPARATUS AND IMAGE PROCESSING METHOD

(71) Applicant: TOSHIBA ALPINE AUTOMOTIVE TECHNOLOGY CORP., Iwaki-shi (JP)

(72) Inventor: Masanori Kosaki, Iwaki (JP)

(73) Assignee: TOSHIBA ALPINE AUTOMOTIVE TECHNOLOGY CORPORATION, Iwaki-shi (JP)

( * ) Notice: Subject to any disclaimer, the term of this patent is extended or adjusted under 35 U.S.C. 154(b) by 0 days.

(21) Appl. No.: 14/571,797

(22) Filed: Dec. 16, 2014

(65) Prior Publication Data

US 2015/0269448 A1    Sep. 24, 2015

(30) Foreign Application Priority Data

Mar. 24, 2014    (JP) ................................ 2014-060737

(51) Int. Cl.
*G06K 9/00*    (2006.01)
*G06K 9/46*    (2006.01)
(Continued)

(52) U.S. Cl.
CPC ............ *G06K 9/00805* (2013.01); *B60R 11/04* (2013.01); *G06K 9/4604* (2013.01); *G06K 9/6255* (2013.01); *H04N 5/28* (2013.01); *G06K 2009/363* (2013.01); *G06K 2209/21* (2013.01)

(58) Field of Classification Search
CPC ............ B60R 11/04; G06K 2009/363; G06K 2209/21; G06K 9/00805; G06K 9/4604; G06K 9/6255; H04N 5/28
USPC ........................................ 382/103
See application file for complete search history.

(56) References Cited

U.S. PATENT DOCUMENTS

| 8,232,872 B2 * | 7/2012 | Zeng | ............ G06K 9/6293 340/425.5 |
| 2010/0104199 A1 * | 4/2010 | Zhang | ............ G06K 9/00798 382/199 |

(Continued)

FOREIGN PATENT DOCUMENTS

| EP | 2 372 605 A2 | 10/2011 |
| JP | 5-278541 | 10/1993 |

(Continued)

OTHER PUBLICATIONS

Extended European Search Report issued Nov. 4, 2015 in Patent Application No. 14199270.1.

(Continued)

*Primary Examiner* — Tom Y Lu
(74) *Attorney, Agent, or Firm* — Oblon, McClelland, Maier & Neustadt, L.L.P.

(57) ABSTRACT

According to one embodiment, an image processing apparatus and an image processing method includes a dictionary generation unit, a processed image generation unit, and a detection unit. The dictionary generation unit generates a single dictionary using a plurality of images of a detection target object picked up by a camera. The plurality of images is obtained by arranging the detection target object at a corresponding plurality of positions in a predetermined range such that a predetermined visual axis of the camera is parallel with a normal-line direction of a detection target surface of the detection target object. The processed image generation unit generates a processed image having the predetermined visual axis as a normal-line direction, based on an image picked up by the camera after generation of the dictionary. The detection unit detects the detection target object included in the processed image by determining a feature value using the dictionary.

9 Claims, 17 Drawing Sheets

(51) Int. Cl.
  *G06K 9/62* (2006.01)
  *H04N 5/28* (2006.01)
  *B60R 11/04* (2006.01)
  *G06K 9/36* (2006.01)

(56) References Cited

U.S. PATENT DOCUMENTS

| | | | | |
|---|---|---|---|---|
| 2013/0177237 A1* | 7/2013 | Schamp | G06K 9/00805 | 382/154 |
| 2014/0152821 A1* | 6/2014 | Fu | G06K 9/00369 | 348/148 |
| 2014/0203959 A1* | 7/2014 | Kriel | G01S 13/867 | 342/52 |
| 2014/0348383 A1* | 11/2014 | Kamiya | G06K 9/00362 | 382/103 |
| 2015/0186736 A1* | 7/2015 | Han | G06K 9/00805 | 382/103 |
| 2015/0242694 A1* | 8/2015 | Miyagawa | B60R 1/00 | 382/103 |
| 2015/0248586 A1* | 9/2015 | Gaidon | G06K 9/00711 | 382/103 |

FOREIGN PATENT DOCUMENTS

| | | |
|---|---|---|
| JP | 2010-44438 | 2/2010 |
| JP | 2010-55195 | 3/2010 |
| JP | 2010-160757 | 7/2010 |

OTHER PUBLICATIONS

Ling Mao, et al., "Preceding Vehicle Detection Using Histograms of Oriented Gradients" IEEE, XP031760644, 2010, pp. 354-358.

Yi-Min Tsai, et al., "An Intelligent Vision-based Vehicle Detection and Tracking System for Automotive Applications" IEEE International Conference on Consumer Electronics (ICCE), XP031921137, 2011, pp. 113-114.

* cited by examiner

IMAGE PROCESSING APPARATUS AND IMAGE PROCESSING METHOD

CROSS-REFERENCE TO RELATED APPLICATIONS

This application claims the benefit of priority of Japanese Patent Application No. 2014-060737, filed Mar. 24, 2014, the entire contents of which are incorporated herein by reference.

FIELD

Embodiments described herein relate generally to an image processing apparatus and an image processing method.

BACKGROUND

Recently, onboard cameras for picking up images of a situation around a vehicle are being mounted in an increasing number of vehicles such as automobiles. The images picked up by the onboard camera are extremely useful because, by detecting an object in the image, the images can be utilized to determine the possibility of a collision between the vehicle and the object or to support steering of the vehicle when parking.

Image processing technology for detecting an object within an image (image based on the picked-up image and including processing target object; hereunder, referred to as "processed image") is being developed at a remarkable pace in recent years with a view to reducing the time required for detection while enhancing the detection accuracy. Pattern matching technology such as technology that uses, for example, HOG (histogram of oriented gradients) feature values may be mentioned as an example of such kind of technology for detecting objects.

However, in pattern matching, if the bilateral symmetry of an object in a processed image is lost, it is extremely difficult to detect the object. For example, in the case of using a camera having a narrow angle of view, an object, at a position that is separated from the center position of the processed image, that is, an object located at a position which is close to the vehicle in which the camera is mounted and deviates in the lateral direction, cannot originally be included in the processed image and therefore cannot be detected in many cases. Further, even when an object is included in the processed image, in a case where a detection target surface (for example, the front surface of an automobile that is approaching from the rear of the vehicle in which the camera is mounted) of the object is not a completely flat surface, the object cannot be detected because the bilateral symmetry thereof is lost.

Further, in a case where, in order to deal with loss of bilateral symmetry, a plurality of dictionaries are previously generated by using images of an object picked up from a corresponding plurality of directions for each dictionary, a large memory that has a size that corresponds to the number of dictionaries is required.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinbelow, a description will be given of an image processing apparatus and an image processing method according to embodiments of the present invention with reference to the drawings.

In general, according to one embodiment, an image processing apparatus includes a dictionary generation unit, a processed image generation unit, and a detection unit. The dictionary generation unit generates a dictionary as a single dictionary in advance using a plurality of images of a detection target object picked up in advance by a camera. The camera is provided on a vehicle and picks up an image around the vehicle with a wide viewing angle. The plurality of images is obtained by arranging the detection target object at a corresponding plurality of positions in a predetermined range within an image-pickup range of the camera so as to make a predetermined visual axis of the camera and a normal-line direction of a detection target surface of the detection target object parallel to each other. The plurality of images is obtained by picking up each of the plurality of images by the camera at the corresponding plurality of positions. The processed image generation unit generates a processed image having the predetermined visual axis as a normal-line direction, based on an image that is picked up by the camera after generation of the dictionary. The detection unit detects the detection target object included in the processed image by determining a feature value using the dictionary.

(Overall Configuration)

Figure 1:
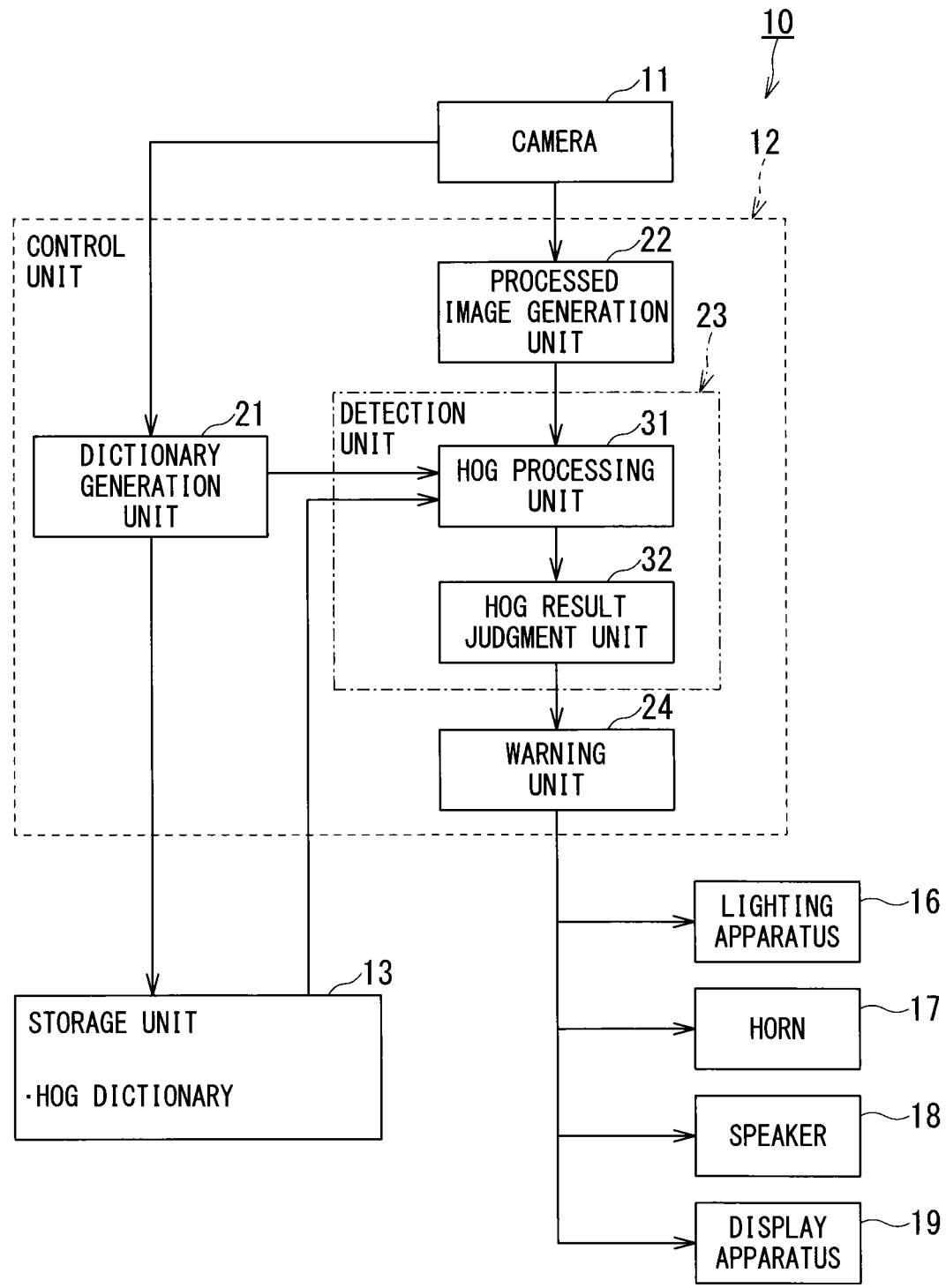
FIG. 1 is a block diagram illustrating one configuration example of an image processing apparatus according to an embodiment of the present invention.

FIG. 1 is a block diagram illustrating one configuration example of an image processing apparatus 10 according to an embodiment of the present invention.

The image processing apparatus 10 includes a camera 11, a control unit 12, a storage unit 13, a lighting apparatus 16, a horn 17, a speaker 18 and a display apparatus 19.

The camera 11 comprises a CCD (charge coupled device) image sensor or a CMOS (complementary metal oxide semiconductor) image sensor, and captures video images of an area around a vehicle such as a private automobile, and generates image data and supplies the image data to the control unit 12.

In the present embodiment, a wide-angle lens or a fish-eye lens may be mounted on the camera 11 to make it possible to pick up images with a wide viewing angle.

For example, in the case of monitoring the rear of the vehicle, the camera 11 is provided in the vicinity of a license plate at a rear part of the vehicle or at an upper part of a rear window. Further, in a case where the camera 11 that is capable of image pickup with a wide viewing angle is arranged in the vicinity of a side-view mirror, it is possible to also simultaneously pick up an image in the front and rear directions of the vehicle in addition to picking up an image in the lateral direction of the vehicle. Furthermore, in the case of monitoring the front of the vehicle, the camera 11 is provided in the vicinity of a license plate at a front part of the vehicle or at an upper part of the front mirror. Naturally, a configuration may also be adopted in which a plurality of the cameras 11 is used to capture images of a wide area outside the vehicle.

An image with a wide viewing angle that is picked-up by the camera 11 is converted (visual axis conversion) by the control unit 12 into a processed image having an arbitrary visual axis. In other words, based on an image with a wide viewing angle that is picked-up by the camera 11, the control unit 12 generates an image (processed image) that was perspectively projected onto a virtual plane of projection of the camera (hereunder, referred to simply as "plane of projection") that has an arbitrary visual axis in a normal-line direction. It is favorable to set the optical axis of the camera 11 so as to be parallel with the ground, or to be in a slightly downward direction from a line that is parallel with the ground.

The control unit 12 comprises, for example, a microcontroller that includes a CPU, a RAM and a ROM. The CPU of the control unit 12 loads an image processing program as well as data necessary for executing the program which are stored in storage media such as the ROM to the RAM. In accordance with the program, the CPU executes processing for flexibly detecting an object even in a case where the shape of the object changes in processed images.

The RAM of the control unit 12 provides a work area for temporarily storing the program executed by the CPU and the data. A storage medium such as the ROM of the control unit 12 stores image processing programs and various kinds of data necessary to execute the programs.

Note that the configurations of the storage media, as typified by the ROM, include recording media that can be read by the CPU, such as a magnetic or optical recording medium or a semiconductor memory, and a configuration may be adopted so as to enable a part or all of the program and data in the storage media to be downloaded through an electronic network, via a network connection unit that is not shown in the drawings.

In such case, the network connection unit implements various protocols for information communication that correspond to the form of the network, and connects the control unit 12 with electronic equipment such as an ECU of another vehicle via the electronic network in accordance with the various protocols. An electrical connection via the electronic network or the like can be applied with respect to the connection. Here, the term "electronic network" refers to information communication networks in general that utilize telecommunications technology and, in addition to a wireless/wired LAN (local area network) and the Internet network, includes a telephone communications network, an optical fiber communications network, a cable communications network, and a satellite communications network and the like.

The storage unit 13 is a nonvolatile memory to and from which the control unit 12 can write and read data. The storage unit 13 stores various information such as an image dictionary (model) that was previously generated using images obtained by picking up an image of a detection target object. These pieces of information may be updated via an electronic network or via a portable storage medium such as an optical disk.

The lighting apparatus 16 is constituted by a common headlight and is controlled by the control unit 12 to perform flashing (so-called "headlight flashing") to, for example, thereby issue a warning with respect to drivers or the like in the surrounding area outside of the own vehicle.

The horn 17 is controlled by the control unit 12, and outputs a warning sound with respect to the surrounding area outside of the own vehicle.

The speaker 18 is provided in the interior of the own vehicle, and is controlled by the control unit 12. The speaker 18 outputs beep sounds or sounds that correspond to various kinds of information, such as information informing of imminent danger, to the driver of the own vehicle.

The display apparatus 19 is provided at a position that can be visually recognized by the driver. A display output device such as a common display for vehicle use, a car navigation system, or a HUD (head up display) can be used as the display apparatus 19. In accordance with control performed by the control unit 12, the display apparatus 19 displays various kinds of information such as an image that is picked up by the camera 11 or an image showing a detection position of a detection target object.

(Overview of Configuration and Operations of Control Unit 12)

Next, an overview of the configuration and operations of function realizing units that are realized by the CPU of the control unit 12 will be described.

As shown in FIG. 1, depending on the image processing program, the CPU of the control unit 12 functions as at least a dictionary generation unit 21, a processed image generation unit 22, a detection unit 23 and a warning unit 24. The detection unit 23 includes a HOG processing unit 31 and a HOG result judgment unit 32.

Each of the units 21 to 24 utilizes a required work area of the RAM as a place for temporarily storing data. Note that the units which implement these functions may be provided by hardware logic such as circuits without using the CPU.

Figure 2:
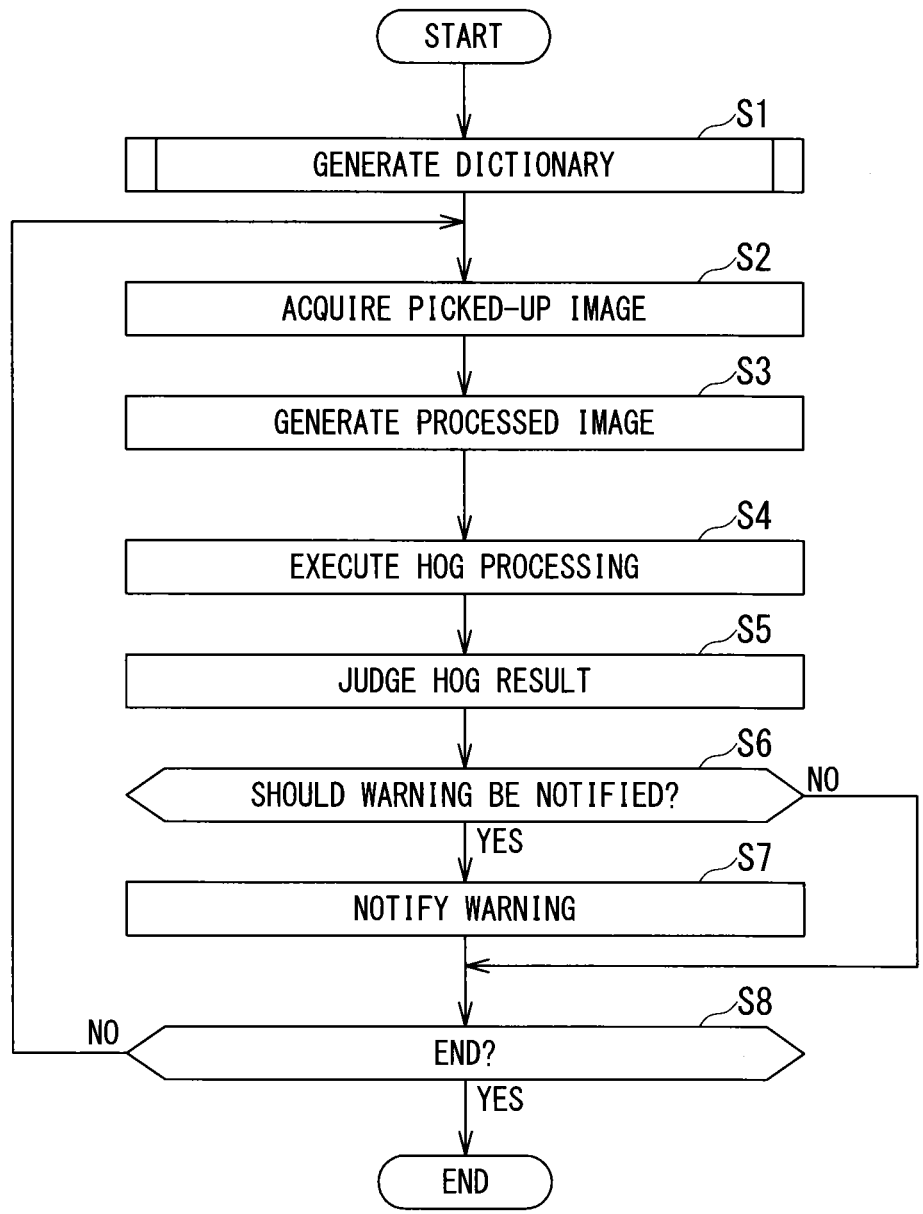
FIG. 2 is a flowchart showing procedures for flexibly detecting an object even in a case where the shape of an object changes in the processed images.

FIG. 2 is a flowchart showing procedures for flexibly detecting an object even in a case where the shape of an object changes in the processed images. These procedures are performed by the CPU of the control unit 12 shown in FIG. 1. In FIG. 2, a symbol including S and a numeral attached thereto denotes the respective steps in the flowchart.

In step S1, the dictionary generation unit 21 generates an image dictionary (model) using images that are previously obtained by picking up images of a detection target object, and stores the image dictionary in the storage unit 13. More specifically, the dictionary generation unit 21 generates the dictionary as a single dictionary in advance using a plurality of images of the detection target object picked up in advance by the camera 11. This plurality of images are obtained by arranging the detection target object at a corresponding plurality of positions in a predetermined range within an image-pickup range of the camera 11 such that the predetermined visual axis of the camera 11 is parallel with a normal line direction of a detection target surface of the detection target object, and are obtained by picking up each of the plurality of images by the camera 11 at the corresponding plurality of positions.

The dictionary that the dictionary generation unit 21 generates has contents that are applicable to various kinds of techniques for detecting an object from an image based on feature values. In the following description, an example is described of a case in which the dictionary that the dictionary generation unit 21 generates is a dictionary (hereunder, referred to as "HOG dictionary") that is suitable for target object detection processing based on HOG feature values (hereunder, referred to as "HOG processing"), and in which the detection unit 23 performs HOG processing.

Next, in step S2, the processed image generation unit 22 acquires a picked-up image in which an image of the area surrounding the vehicle was picked up with a wide viewing angle from the camera 11.

Next, in step S3, based on the picked-up image acquired from the camera 11, the processed image generation unit 22 generates a processed image as an image that has been perspectively projected onto a plane of projection which adopts a visual axis as a normal-line direction, the visual axis being the same as the visual axis used to generate the dictionary.

Next, in step S4, the HOG processing unit 31 of the detection unit 23 performs HOG processing (for example, refer to Japanese Patent Laid-Open No. 2010-44438 or Japanese Patent Laid-Open No. 2010-55195), and outputs a likelihood. More specifically, the HOG processing unit 31 converts the processed image into a gradient direction image, scans a frame of a predetermined size that is in accordance with the detection target object, and determines a HOG feature value for each scanning position using the HOG dictionary. The HOG processing unit 31 thereby determines likelihoods that show the probability of the detection target object being present at the respective scanning positions. The HOG processing unit 31 can determine the likelihood (score) by applying to the dictionary an image within the scanning frame at the respective scanning positions. It can be said that the higher the likelihood is, the greater the degree to which the relevant image matches the dictionary.

A HOG feature value is a value in which the extent to which edges in a longitudinal, transverse, and oblique direction exist within a block is quantified. Consequently, it is known that it is difficult for HOG feature values to be affected by changes in brightness or the like, and that HOG feature values are robust with respect to changes in shape. Note that the HOG processing performed by the HOG processing unit 31 may be processing that utilizes a co-occurrence property (coHOG processing).

Next, in step S5, the HOG result judgment unit 32 of the detection unit 23 takes a result in which a likelihood obtained by the HOG processing unit 31 is greater than a threshold value as a valid result, and outputs information to the effect that a detection target object was detected at a position in a scanning frame that corresponds to the valid result to the warning unit 24. When a plurality of valid results were obtained, the HOG result judgment unit 32 outputs the most valid result among the respective results by selecting a single result having the highest likelihood, by subjecting the respective results to simple averaging, or by subjecting the respective results to weighted averaging using the respective likelihoods.

Next, in step S6, the warning unit 24 determines whether or not information regarding the position of the detection target object that was detected by the HOG result judgment unit 32 and the like should be notified to the driver of the own vehicle. If the warning unit 25 determines that the output result of the HOG result judgment unit 32 should be notified, the CPU advances to step S7. In contrast, if the warning unit 24 determines that the output result need not be notified, the CPU advances to step S8. For example, the warning unit 24 can determine that the position of the detection target object should be notified to the driver in a case where the position is a position within a predetermined distance from the own vehicle. A configuration may also be adopted in which the present step S6 is not executed.

Next, in step S7, the warning unit 24 notifies the information regarding the detection target object detected by the HOG result judgment unit 32 to the driver of the own vehicle by performing at least one operation among an audio output operation through the speaker 18, a buzzer output operation through the speaker 18, and an operation to display a warning on the display apparatus 19 to the driver of the own vehicle, and thereafter the CPU advances to step S8. For example, the warning unit 24 superimposes the scanning frame on the processed image to which the most valid result outputted by the HOG result judgment unit 32 corresponds, and displays the resulting image on the display apparatus 19. Further, the warning unit 24 may also issue a warning to the surrounding area outside the own vehicle by flashing the lighting apparatus 16 (so-called "headlight flashing") or by means of a warning sound of the horn 17.

Next, in step S8, the control unit 12 determines whether or not to end the present series of procedures. For example, the control unit 12 ends the series of procedures if the own vehicle has been stopped for a predetermined time period or more, or if an instruction was input by the driver. In the case of continuing the procedures, the CPU returns to step S2 to acquire an image of the next frame image from the camera 11 and repeat the processing of steps S3 to S7.

By performing the above described procedures, even in a case where the shape of an object in a processed image changes, the object can be flexibly detected.

(Generation of Dictionary)

A dictionary that is generated by the dictionary generation unit 21 according to the present embodiment will now be described.

Figure 3A:
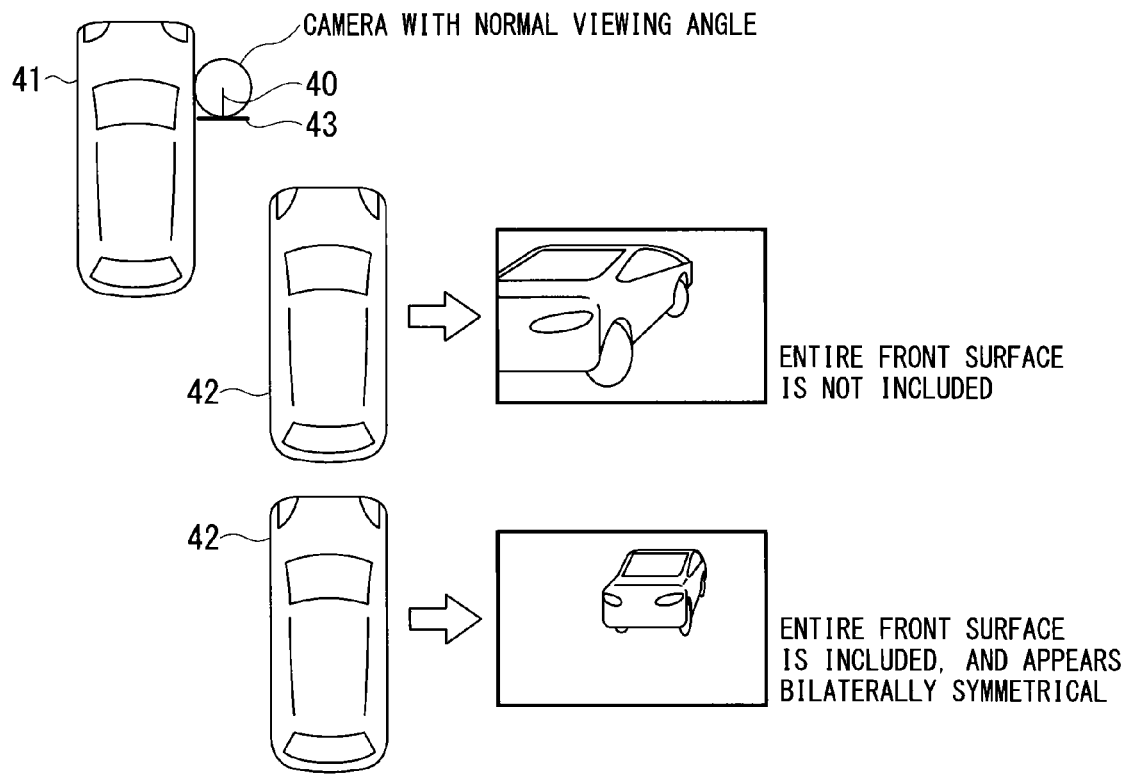
FIG. 3A is an explanatory drawing that illustrates an example of a processed image that is generated in a case where a camera having a normal viewing angle is used, and a visual axis faces directly backward in parallel with the travelling direction of the own vehicle.
Figure 3B:
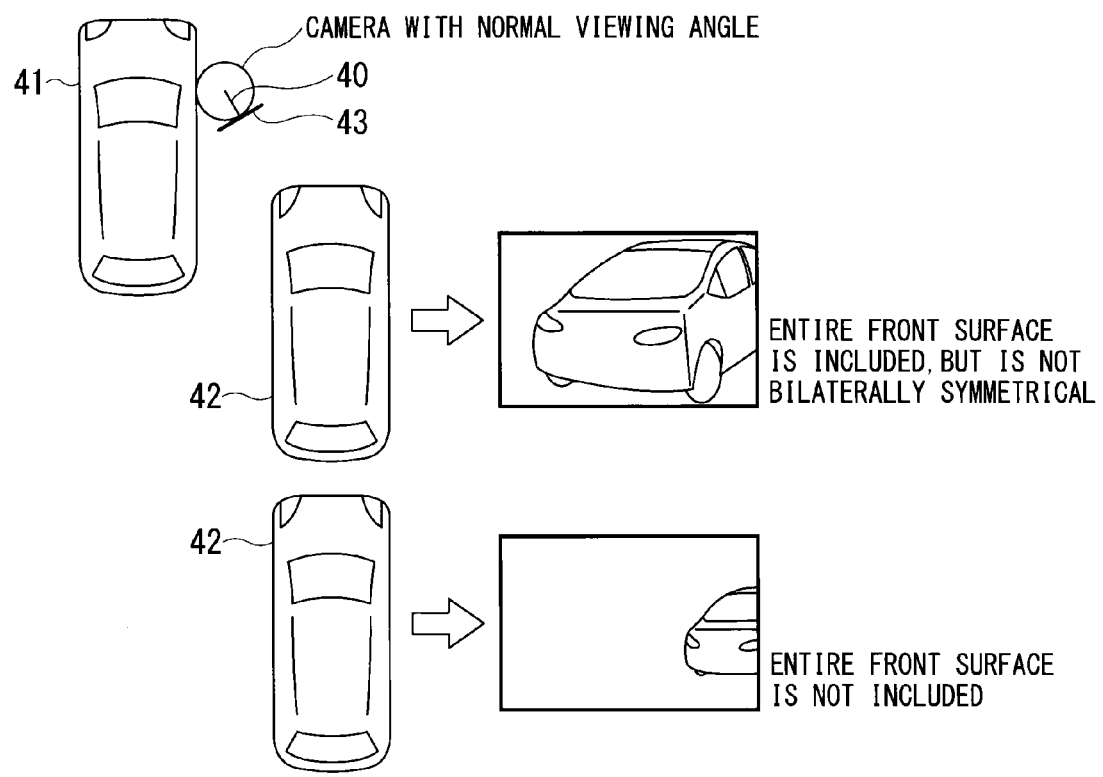
FIG. 3B is an explanatory drawing that illustrates an example of a processed image that is generated in a case where a camera having a normal viewing angle is used, and the visual axis faces directly backward diagonally with respect to the travelling direction of the own vehicle.

FIG. 3A is an explanatory drawing that illustrates an example of a processed image that is generated in a case where a camera having a normal viewing angle is used, and a visual axis 40 faces directly backward in parallel with the travelling direction of the own vehicle 41. FIG. 3B is an explanatory drawing that illustrates an example of a processed image that is generated in a case where a camera having a normal viewing angle is used, and the visual axis 40 faces directly backward diagonally with respect to the travelling direction of the own vehicle 41. Further, FIG. 4 is an explanatory drawing that illustrates an example of a processed image that is generated in a case where a camera having a wide viewing angle is used, and the visual axis 40 faces diagonally backward with respect to the travelling direction of the own vehicle 41.

Figure 4:
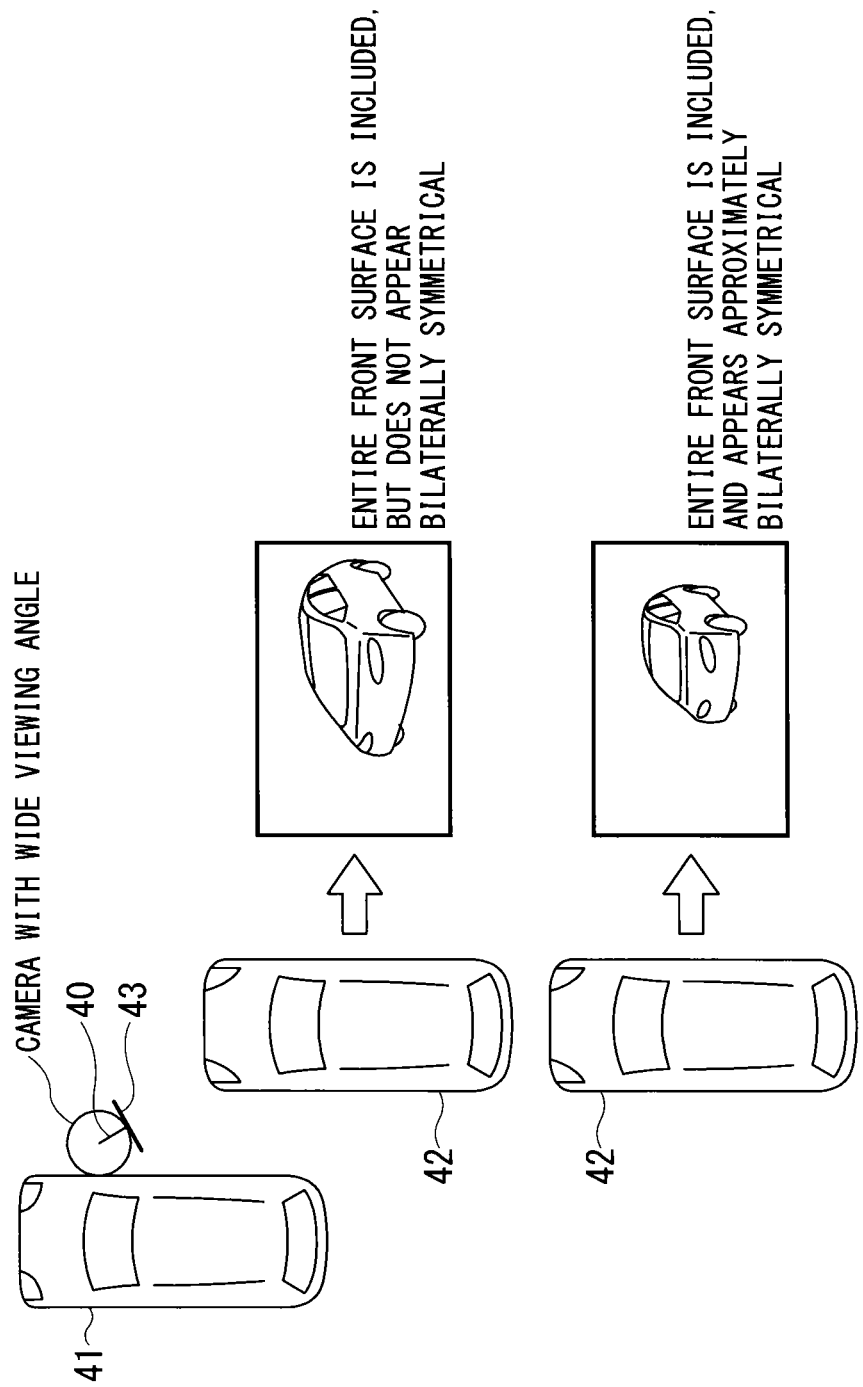
FIG. 4 is an explanatory drawing that illustrates an example of a processed image that is generated in a case where a camera having a wide viewing angle is used, and the visual axis faces diagonally backward with respect to the travelling direction of the own vehicle.

Note that, FIG. 3 and FIG. 4 illustrate an example of a case of detecting the detection target object 42 that is approaching from the rear of the own vehicle 41 by means of a camera (side camera) arranged in the vicinity of a side-view mirror.

In a case where the detection target surface of the detection target object 42 is completely flat, the shape of the detection target surface will be identical in the processed image regardless of the position at which the detection target object 42 appears in the processed image if a processed image is generated such that a normal-line direction of the detection target surface and the visual axis 40 (normal-line direction of the plane of projection 43) match. However, when the detection target surface is not completely flat, the shape of the detection target surface in the processed image will change in accordance with the position at which the detection target object 42 appears in the processed image.

For example, a case will be considered in which the detection target surface is the front surface of an automobile. Although the front surface of an automobile can be regarded as a substantially flat surface, the front surface cannot be said to be a completely flat surface In this case, when a processed image having the visual axis 40 that faces directly backward in parallel with the travelling direction of the own vehicle 41 is generated using a camera that has a normal viewing angle (see FIG. 3A) and when the detection target object 42 is far away, the entire detection target surface of the detection target object 42 (for example, all or a part of the front surface of an automobile) appears in the processed image, and the detection target surface appears bilaterally symmetrical. However, when the detection target object 42 is near to the own vehicle 41, only some of the detection target object 42 appears in the processed image.

On the other hand, when a processed image having the visual axis 40 that faces directly backward diagonally with respect to the travelling direction of the own vehicle 41 is generated using a camera that has a normal viewing angle (see FIG. 3B), in a case where the detection target object 42 is close to the vehicle 41, although the entire detection target surface appears in the processed image, the detection target surface does not appear bilaterally symmetrical. Further, when the detection target object 42 is far away, only some of the detection target object 42 appears in the processed image.

Furthermore, when a processed image having the visual axis 40 that faces diagonally backward with respect to the travelling direction of the own vehicle 41 is generated using a camera that has a wide viewing angle (see FIG. 4), although the entire detection target object 42 that is far away appears in the processed image, the detection target object 42 that is close to the vehicle 41 does not appear bilaterally symmetrical similarly to the example illustrated in FIG. 3B.

Figure 5:
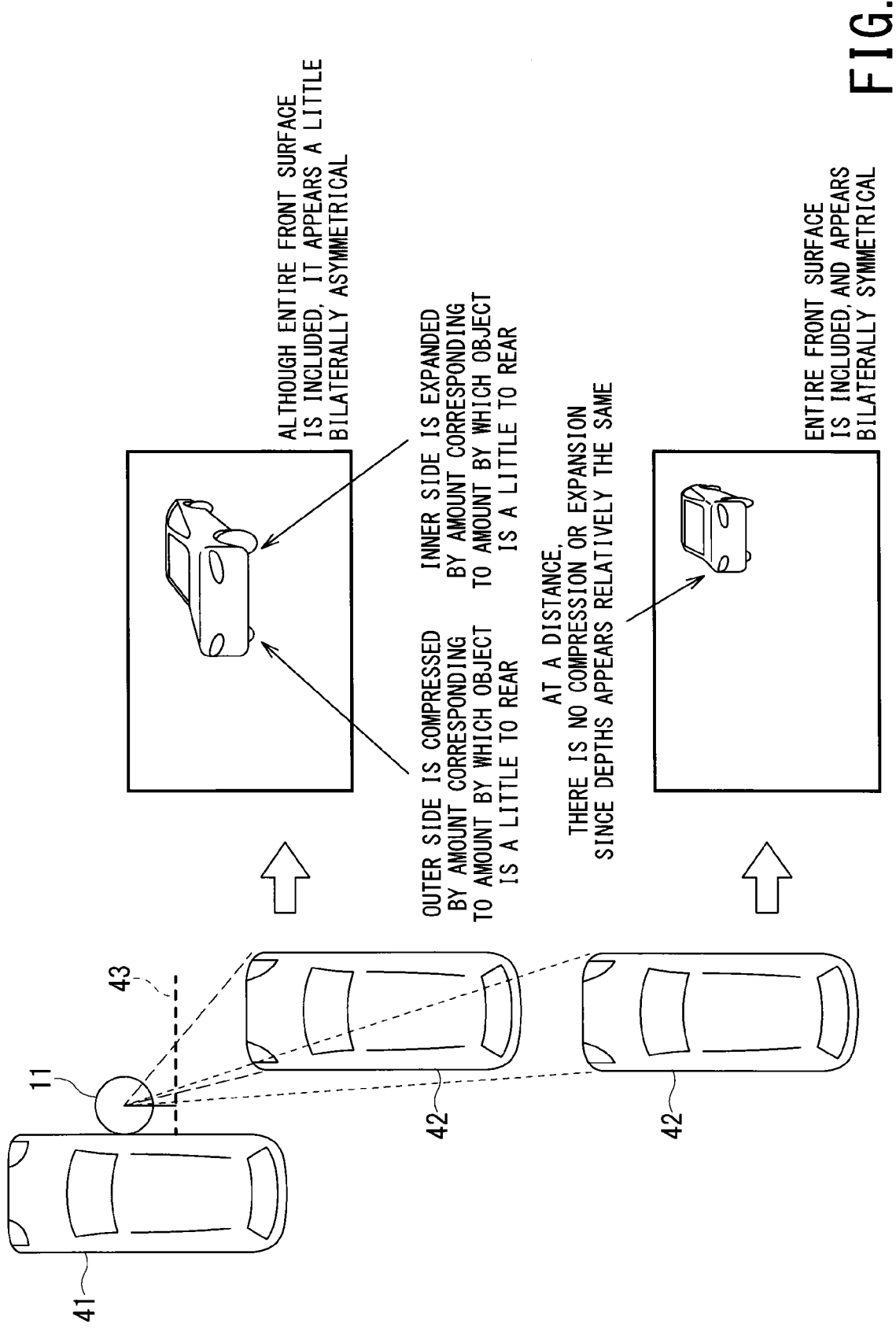
FIG. 5 is an explanatory drawing that illustrates an example of a processed image according to the present embodiment that is generated using the camera that has a wide viewing angle in a case where a visual axis faces directly backward in parallel with the travelling direction of the own vehicle.

FIG. 5 is an explanatory drawing that illustrates an example of a processed image according to the present embodiment that is generated using the camera 11 that has a wide viewing angle in a case where a visual axis 40 faces directly backward in parallel with the travelling direction of the own vehicle 41.

In the present embodiment, a processed image having the visual axis 40 that faces directly to the rear in parallel with the travelling direction of the own vehicle 41 is generated using the camera 11 that has a wide viewing angle (see FIG. 5).

In comparison with a case as in the cases illustrated in FIG. 3 and FIG. 4 where the bilateral symmetry is lost to a significant extent or a case where originally only some of the detection target object 42 appears in the processed image, the manner in which the detection target object 42 appears in the processed image is improved. For example, when a detection target object 42 is far away, the entire detection target surface of the detection target object 42 appears in the processed image, and the detection target surface appears bilaterally symmetrical. On the other hand, when the detection target object 42 is close to the vehicle 41, the entire detection target surface appears in the processed image, and the detection target surface appears bilaterally asymmetrical to a small degree. This is because, in a case where a surface is not completely flat, there is a difference in the appearance of the relative depth between the left and right sides.

A conventional dictionary is generated without assuming that the shape of the detection target object 42 will change in processed images. Therefore, when using only one conventional dictionary, in the example illustrated in FIG. 5, the detection target object 42 cannot be detected from the processed image in a case where the detection target object 42 is close to the vehicle 41. Further, when using dictionaries that are in accordance with a plurality of shapes in order to correspond to changes in shape, a large storage medium of a size that corresponds to the number of dictionaries is required, and a large load is applied for the detection processing and the processing time also increases.

So as to enable detection of the detection target object 42 under the positional relationship between the visual axis 40 and the detection target surface normal-line direction as shown in FIG. 5, the dictionary generation unit 21 according to the present embodiment generates a single dictionary in advance using images obtained by arranging the detection target object 42 at a plurality of positions in a predetermined range within an image-pickup range of the camera 11 such that the predetermined visual axis 40 of the camera 11 and a normal-line direction of a detection target surface of the detection target object 42 become parallel, and then picking up images of the detection target object 42 in advance at each of a plurality of positions by means of the camera 11.

Figure 6:
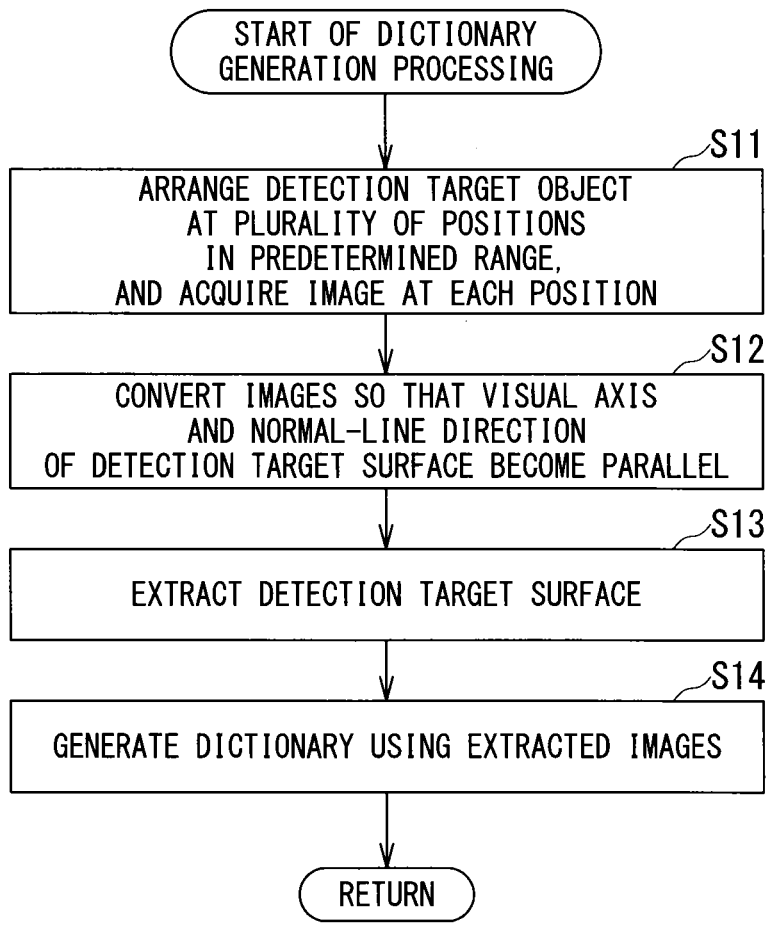
FIG. 6 is a subroutine flowchart illustrating one example of detailed procedures of dictionary generation processing executed by the dictionary generation unit in step S1 in FIG. 2.

FIG. 6 is a subroutine flowchart illustrating one example of detailed procedures of dictionary generation processing executed by the dictionary generation unit 21 in step S1 in FIG. 2. Note that dictionary generation may be performed at any time prior to executing the steps from step S2 onwards in FIG. 2. Therefore, picked-up images required for dictionary generation may be acquired using the camera 11 of the own vehicle 41 or may be acquired using another fixed camera or the like.

Figure 7:
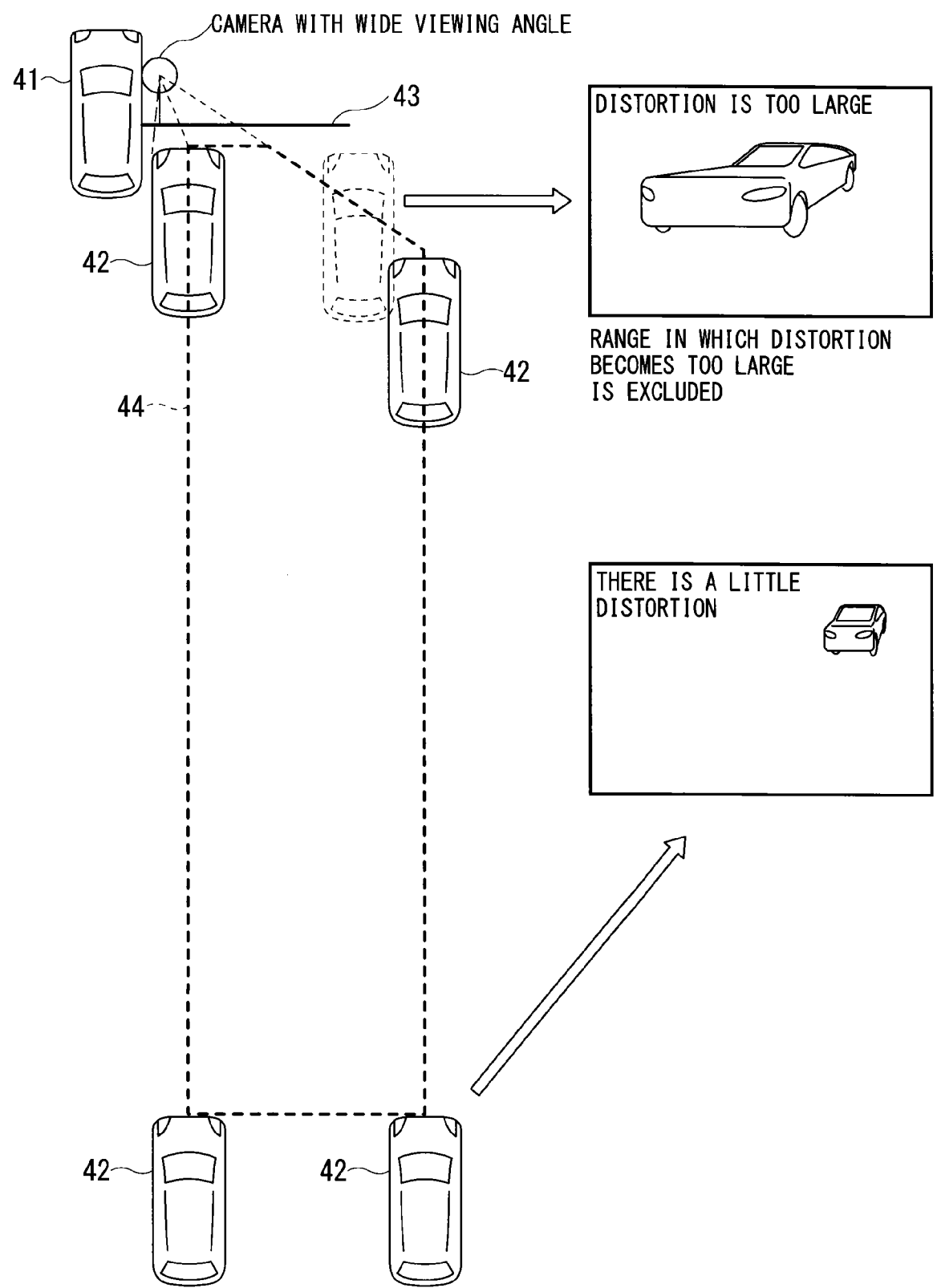
FIG. 7 is an explanatory drawing that illustrates an example of a predetermined range that is set when generating a dictionary using the dictionary generation unit.

Further, FIG. 7 is an explanatory drawing that illustrates an example of a predetermined range 44 that is set when the dictionary generation unit 21 generates a dictionary. In step S11, the dictionary generation unit 21 acquires images of the detection target object 42 at a plurality of positions in the predetermined range 44 that were picked up with the camera 11. At each position, the detection target object 42 is arranged such that the travelling direction of the own vehicle 41 matches the normal-line direction of the detection target surface.

It is favorable to adopt a surface that can be regarded as a flat surface to a certain extent as the detection target surface. For example, in a case where the detection target object 42 is an automobile, it is favorable to adopt the front surface, side surfaces and rear surface of the automobile as detection target surfaces. Further, in a case where the own vehicle 41 is a truck or a bus and the camera 11 can be mounted at a high position, the top surface of the automobile may also be adopted as a detection target surface. Naturally, a detection target surface is not limited to the surfaces of an automobile, and may be a side surface of a motorcycle or the like.

Next, in step S12, the dictionary generation unit 21 converts the picked-up images so as to have the visual axis 40 that is parallel with the normal-line direction of the detection target surface. Note that, the present step S12 need not be executed in a case where the camera 11 is installed so as to previously match the so-called optical axis of the camera 11 with the travelling direction of the own vehicle 41 and a lens distortion is corrected.

Next, in step S13, the dictionary generation unit 21 extracts the detection target surface from the images having the visual axis 40.

Subsequently, in step S14, the dictionary generation unit 21 generates a dictionary using the extracted images, and stores the dictionary in the storage unit 13.

The predetermined range 44 is a range that the detection unit 23 takes as a detection target range. A shape at a position that deviates significantly from the center of a picked-up image changes significantly in comparison to the shape at the center. Consequently, it is favorable to make the predetermined range 44 a range in which such changes in shape are not too large. For example, the predetermined range 44 is set as a range from the visual axis 40 that is parallel with the travelling direction of the own vehicle 41 to an angle between around 30 degrees to 60 degrees (for example, to an angle of 45 degrees) towards the outer side of the own vehicle 41. Further, in a case where the detection target object 42 is a truck or a bus, a detection target surface can be regarding as being more parallel. Therefore, the predetermined range 44 may be widened to a range that extends from the visual axis 40 that is parallel to the travelling direction of the own vehicle 41 to an angle of around 85 degrees towards the outer side of the own vehicle 41.

Further, for example, in a case where the predetermined range 44 is set as a range that exceeds an angle of 45 degrees towards the outer side of the own vehicle 41 from the visual axis 40, a side surface of the detection target object 42 also becomes visible. Therefore, when adopting a range that exceeds 45 degrees, a side surface of the detection target object 42 may be taken as a detection target surface, and a dictionary may be separately generated for which the visual axis 40 is made parallel with the normal-line direction of the side surface (direction perpendicular to the travelling direction of the own vehicle 41). At such time, the detection target surface may be a small region such as a part of a side surface towards the front of the vehicle or a tire. By adopting a small region as a detection target surface to be extracted for a dictionary in a case where the visual axis 40 is parallel to the normal-line direction of a side surface, it is possible to reduce an influence caused by the decrease of the resolution with the increase in the distance from the camera 11 or an influence caused by the distortion of the side surface of the detection target object 42 (when the surface is not completely flat) with the increase in the distance from the camera 11.

In FIG. 7, an example is illustrated of a case where it is assumed that the image processing apparatus 10 detects another vehicle which is travelling in a traffic lane adjacent to the traffic lane in which the own vehicle 41 is travelling and is approaching the own vehicle 41. In this example, the predetermined range 44 is taken as the total of a range extending from the visual axis 40 to an angle of 45 degrees towards the outer side of the own vehicle 41 within a predetermined distance from the camera 11 and, from a position that is further than the predetermined distance from the camera 11, a range extending over a predetermined distance from the visual axis 40 towards the outer side of the own vehicle.

According to the above described procedures, a single dictionary that corresponds to the predetermined range 44 can be generated that incorporates images of the detection target object 42 in which the bilateral symmetry has been lost to a certain extent.

A dictionary that the dictionary generation unit 21 generates is a dictionary in which images, the bilateral symmetry of which has been lost, are also learned on the assumption of a case arising in which a detection target surface is not a completely flat surface and the bilateral symmetry in the processed image is lost. Consequently, using only this single dictionary, the detection unit 23 can detect the detection target object 42 which appears at a position that is separated from the center of the processed image and the shape of which is slightly distorted, although the likelihood with respect thereto is somewhat lowered. Accordingly, it is possible for the detection unit 23 to detect the detection target object 42 at positions over a wide range (predetermined range 44) from the processed image with a single dictionary.

(Processed Image Generation)

Next, a processed image that is generated by the processed image generation unit 22 according to the present embodiment will be described.

Although FIGS. 3 to 5 illustrate an example of detecting the detection target object 42 that is approaching from the rear of the own vehicle 41 by means of the camera (side camera) that is arranged in the vicinity of a side-view mirror, the image processing apparatus 10 according to the present embodiment may also include the camera 11 at a plurality of places, and may also detect the detection target object 42 that approaches from the side or the front.

Figure 8:
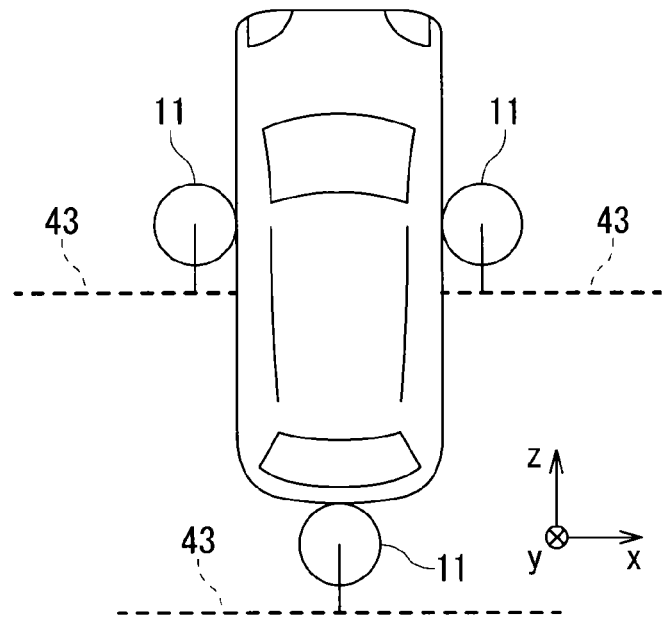
FIG. 8 is an explanatory drawing that illustrates an example in which the camera provided on the left and right sides and at a rear part of the vehicle, and shows the visual axis and a plane of projection of each camera in the case of detecting the front surface of another vehicle that runs alongside the own vehicle.
Figure 8:
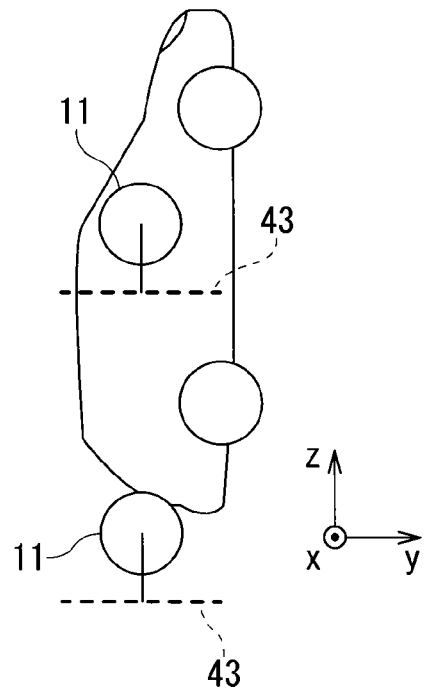
Figure 8:
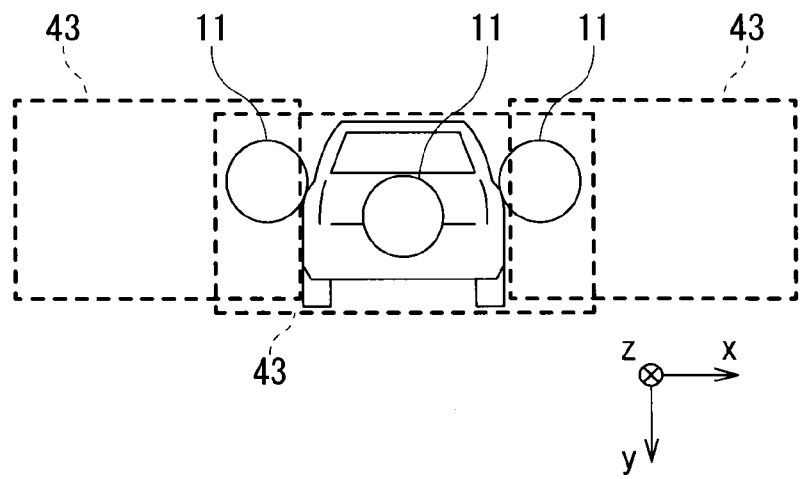

FIG. 8 is an explanatory drawing that illustrates an example in which the camera 11 provided on the left and right sides and at a rear part of the vehicle 41, and shows the visual axis 40 and a plane of projection 43 of each camera in the case of detecting the front surface of another vehicle that runs alongside the own vehicle 41. In the case of detecting the front surface of another vehicle that runs alongside the own vehicle 41, the processed image generation unit 22 generates a processed image that was perspectively projected onto the plane of projection 43 having the visual axis 40 towards the rear in parallel with the travelling direction of the own vehicle 41 based on an image picked up by the camera 11.

Figure 9:
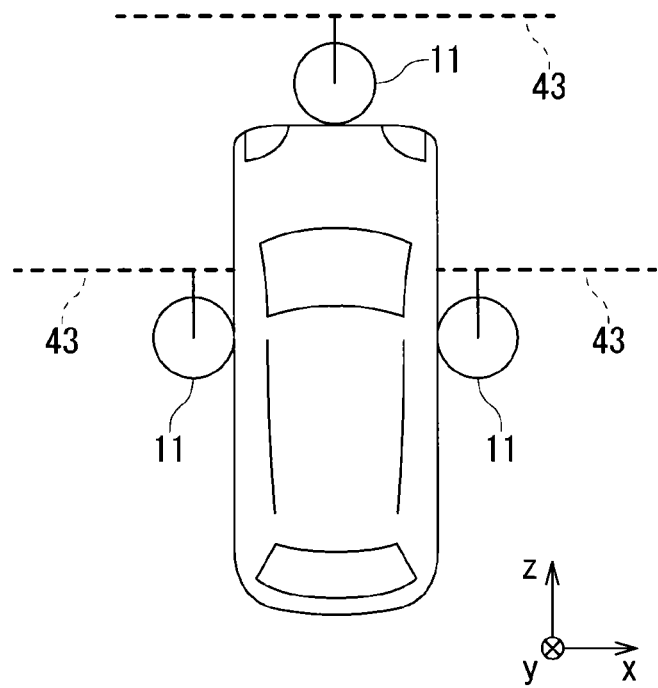
FIG. 9 is an explanatory drawing that illustrates an example in which the camera is provided on the left and right sides and at a front part of the vehicle, and shows the visual axis and the plane of projection of each camera in the case of detecting the rear surface of another vehicle that runs alongside the own vehicle.
Figure 9:
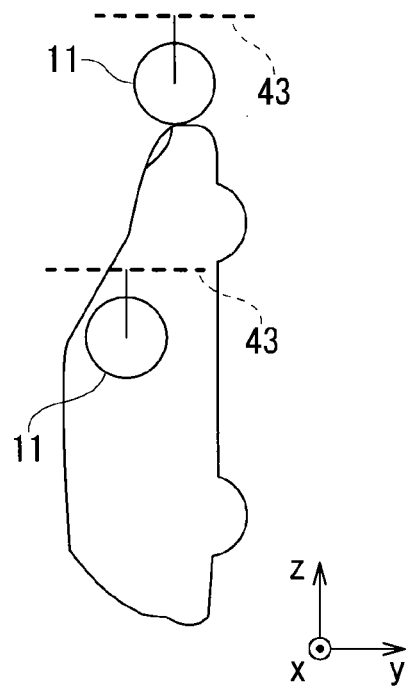
Figure 9:
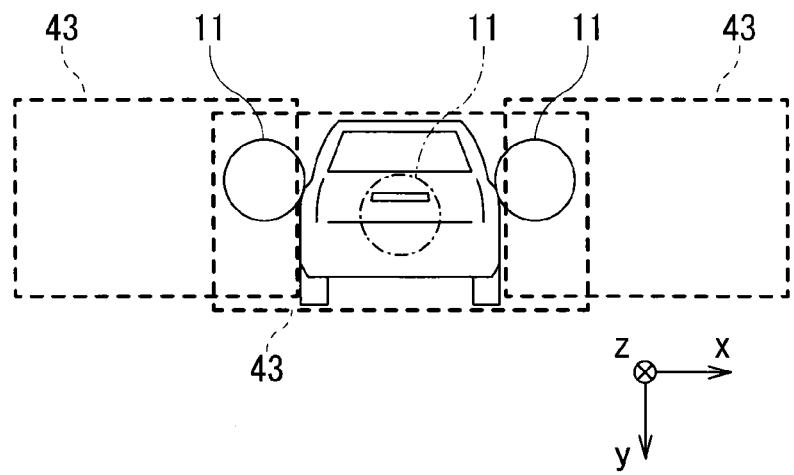

FIG. 9 is an explanatory drawing that illustrates an example in which the camera 11 is provided on the left and right sides and at a front part of the vehicle 41, and shows the visual axis 40 and the plane of projection 43 of each camera 11 in the case of detecting the rear surface of another vehicle that runs alongside the own vehicle 41. In the case of detecting the rear surface of another vehicle that runs alongside the own vehicle 41, the processed image generation unit 22 generates a processed image that was perspectively projected onto the plane of projection 43 having the visual axis 40 towards the front in parallel with the travelling direction of the own vehicle 41 based on an image picked up by the camera 11.

Figure 10:
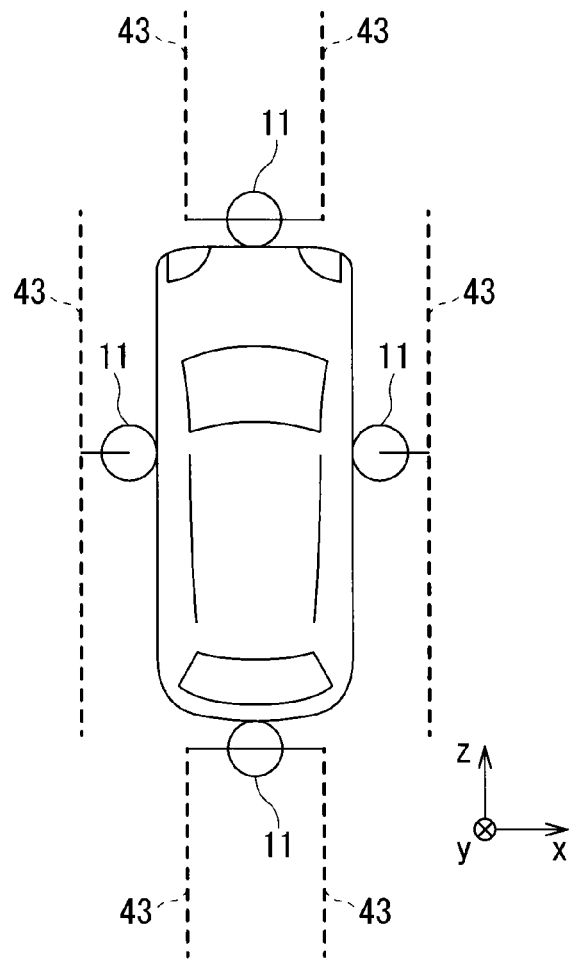
FIG. 10 is an explanatory drawing that illustrates an example in which the camera is provided on the left and right sides and at a front part and a rear part of the vehicle, and shows the visual axis and the plane of projection of each camera in the case of detecting the side surface of another vehicle that runs alongside the own vehicle.
Figure 10:
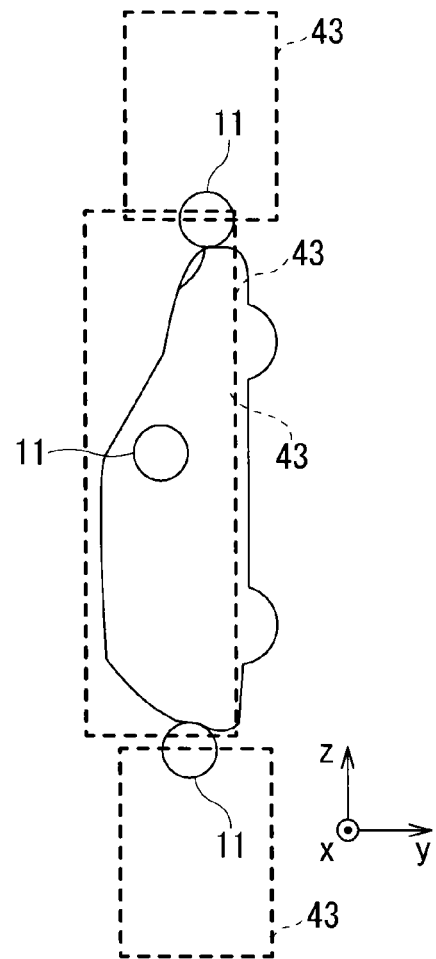
Figure 10:
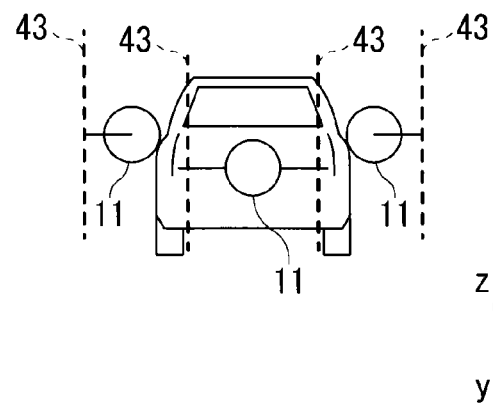

FIG. 10 is an explanatory drawing that illustrates an example in which the camera 11 is provided on the left and right sides and at a front part and a rear part of the vehicle 41, and shows the visual axis 40 and the plane of projection 43 of each camera 11 in the case of detecting the side surface of another vehicle that runs alongside the own vehicle 41. In the case of detecting the side surface of another vehicle that runs alongside the own vehicle 41, the processed image generation unit 22 generates a processed image that was perspectively projected onto the plane of projection 43 having the visual axis 40 that is perpendicular to the travelling direction of the own vehicle 41 based on an image picked up by the camera 11.

The image processing apparatus 10 of FIGS. 8 to 10 each utilizes individual dictionaries that correspond to each visual axis 40. These dictionaries are generated in advance by the dictionary generation unit 21. Naturally, a dictionary that corresponds to all the detection target surfaces of FIGS. 8 to 10 (front surface, rear surface and side surface of another vehicle) may be prepared in advance, and all the detection target surfaces may be taken as a detection object.

Figure 11:
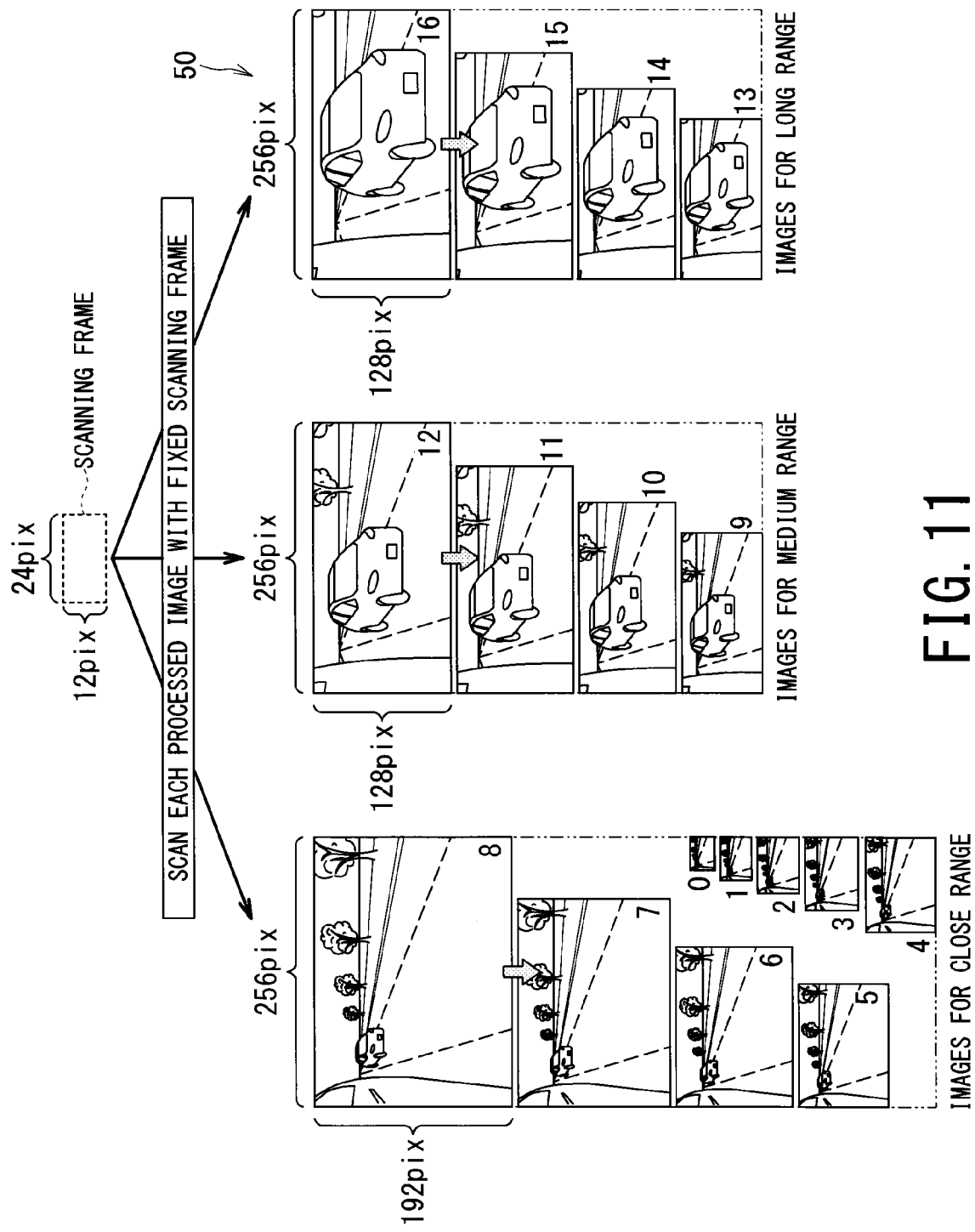
FIG. 11 is an explanatory drawing illustrating an example of image pyramid generated by the processed image generation unit.

FIG. 11 is an explanatory drawing illustrating an example of image pyramid 50 generated by the processed image generation unit 22. In FIG. 11, images are illustrated that are denoted by reference numerals 0 to 16 in order from the most reduced image (image with the lowest resolution). Further, in FIG. 11, an example is illustrated in which a plurality of processed images are classified into images for close range, images for medium range, and images for long range, respectively, in accordance with the scaling factor (enlargement/reduction ratio). Further, in FIG. 11, an example is illustrated of a case where the images for close range (0-8) are magnified with respect to each other by a magnification rate of 1.3 times, the images for medium range (9-12) are magnified with respect to each other by a magnification rate of 1.19 times, and the images for long range (13-16) are magnified with respect to each other by a magnification rate of 1.19 times.

A dictionary generated by the dictionary generation unit 21 may be a dictionary that corresponds to images of a predetermined size (for example, a size of 24*12 pixels with respect to width*length or the like) in accordance with the detection target object 42. In this case, the detection unit 23 scans a scanning frame of a predetermined size (for example, 24*12 pixels) on the processed image. Meanwhile, the size of the detection target object 42 on the processed image differs according to the distance of the detection target object 42 from the vehicle 41 of the detection unit 23. For example, in a case where the detection target object 42 is far from the vehicle 41, the detection target object 42 appears in a small size on the processed image in comparison to when the detection target object 42 is close to the vehicle 41.

Therefore, in a case where the detection unit 23 scans a scanning frame of a certain size on the processed image, it is favorable for the processed image generation unit 22 to generate an image group (image pyramid) 50 that includes a plurality of processed images for which distances with respect to the plane of projection 43 that are set from the own vehicle 41 are mutually different. At such time, the processed image generation unit 22 generates each processed image such that the respective processed images have the visual axis 40 that is parallel to the normal-line direction of the detection target surface, that is, have the visual axis 40 that is identical to the visual axis 40 used for dictionary generation.

It can be measured in advance a distance to the detection target object 42 from the own vehicle 41 in a case where the size of the detection target object 42 on the processed image matches the size of the scanning frame. Therefore, each processed image can be associated in advance with a distance to the detection target object 42 from the own vehicle 41. The smaller that a processed image is, the shorter the distance from the own vehicle 41 that is associated therewith will be.

Note that, it is sufficient that the respective processed images are associated with mutually different distances from the own vehicle 41, and the processed images may be generated by scaling (enlarging or reducing) images picked up by the camera 11 using a plurality of scaling factors, or may be generated at intervals of a certain distance (for example, two meters) from the own vehicle 41 to the detection target object 42.

When generating the image pyramid 50, the processed image generation unit 22 sets the plane of projection 43 for each predetermined distance from the own vehicle 41, and generates the respective processed images using the respective planes of projection 43 based on picked-up image.

In a case where the respective planes of projection 43 have the same visual axis 40, the detection unit 23 can apply a single dictionary with respect to all of the processed images constituting the image pyramid 50. When the image pyramid 50 is generated, the detection unit 23 scans a scanning frame (a frame of a predetermined size) on each processed image, and performs detection processing to detect the detection target object 42 based on HOG feature values using the HOG dictionary.

(HOG Processing Region)

Figure 12:
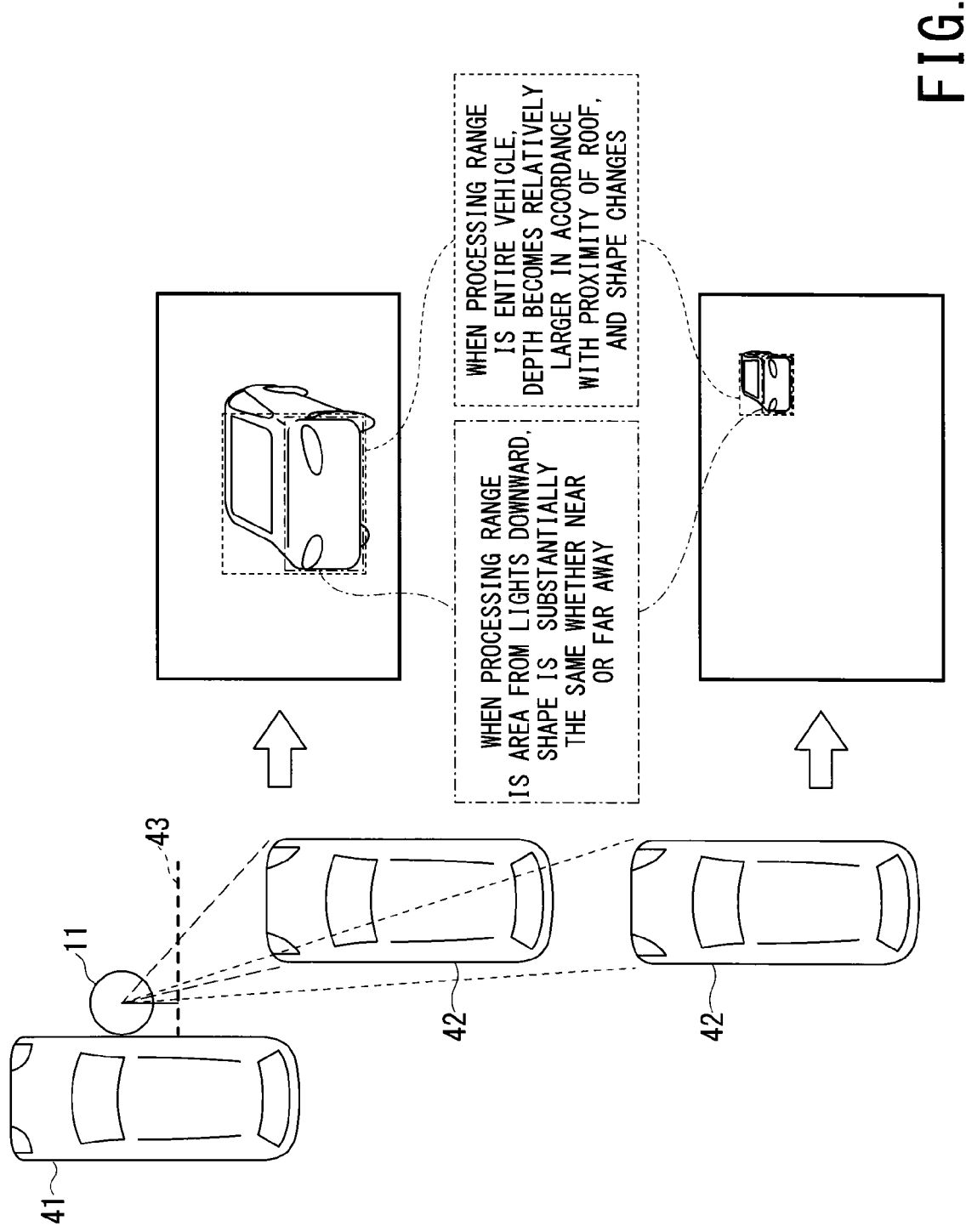
FIG. 12 is an explanatory diagram illustrating a region (detection target surface) that serves as an object of HOG processing by the HOG processing unit.

FIG. 12 is an explanatory diagram illustrating a region (detection target surface) that serves as an object of HOG processing by the HOG processing unit 31.

It is preferable that the detection target surface is a region that can be regarded as a flat surface to a certain extent, even if the detection target surface is not a completely flat surface. Therefore, in a case where the detection target object 42 is an automobile and the visual axis 40 is parallel to the travelling direction of the own vehicle 41, it is favorable if the detection unit 23 takes an area around lights on the front surface of the automobile (other vehicle) as the detection target surface (HOG processing region). This is because, since a front glass portion is positioned to the rear relative to the lights when viewed from the own vehicle 41, in a case where the automobile (other vehicle) is at a position that is close to the own vehicle 41 and is at the side thereof, a processed image will be created in which the lateral positions of the front glass portion and the area around the lights are shifted.

Note that, in a case where the image processing apparatus 10 takes only positions that are at a distance from the own vehicle 41 as the predetermined range 44, since the depths with respect to the front glass portion and the area around the lights become approximately the same relatively, the entire automobile including the front glass may be taken as the detection target surface (HOG processing region).

Further, in a case where the visual axis 40 is perpendicular to the travelling direction of the own vehicle 41, it is favorable to take a side surface of the other vehicle as the detection target surface. The detection target surface may be a small region such as a part of a side surface towards the front of the vehicle or a tire. By adopting a small region as the detection target surface, it is possible to reduce an influence caused by the decrease of the resolution with the increase in the distance from the camera 11 or an influence caused by the distortion of the side surface of the detection target object 42 (in a case where the surface is not completely flat) with the increase in the distance from the camera 11.

The image processing apparatus 10 according to the present embodiment can use a dictionary that is capable of detecting the detection target object 42 at a wide range of positions. The above-described single dictionary also corresponds to a case where the detection target object 42 that is included in an image picked up by the camera 11 that has a wide viewing angle appears at position that is separated from the center of the image and the shape thereof is consequently distorted in comparison a case where the detection target object 42 appears at the center of the image. Therefore, even if the shape of the detection target object 42 is distorted in an image obtained by picking up an image of a wide range using the camera 11 having a wide viewing angle, the detection target object 42 can be detected flexibly and stably while suppressing the occurrence of an erroneous detection using a single dictionary.

Further, the image processing apparatus 10 can detect the detection target object 42 at a wide range of positions using a single dictionary. Therefore, in comparison to using a plurality of dictionaries, the required storage capacity can be significantly decreased, and a load applied in the detection processing can be reduced to thereby reduce the processing time.

Further, in a case where the other vehicle is in close proximity to the own vehicle 41, the image processing apparatus 10 can make the visual axis 40 a direction that is perpendicular to the travelling direction of the own vehicle 41, make the predetermined range 44 a wide range along the travelling direction of the own vehicle 41, and set the detection target surface as the side surface or a detection object of the other vehicle. Therefore, in particular in a case where the camera 11 is provided in the vicinity of a side-view mirror, another vehicle that overtakes the own vehicle 41 can also be monitored at a position that is close to the own vehicle 41.

(First Modification Example of Processed Image Generation)

Figure 13:
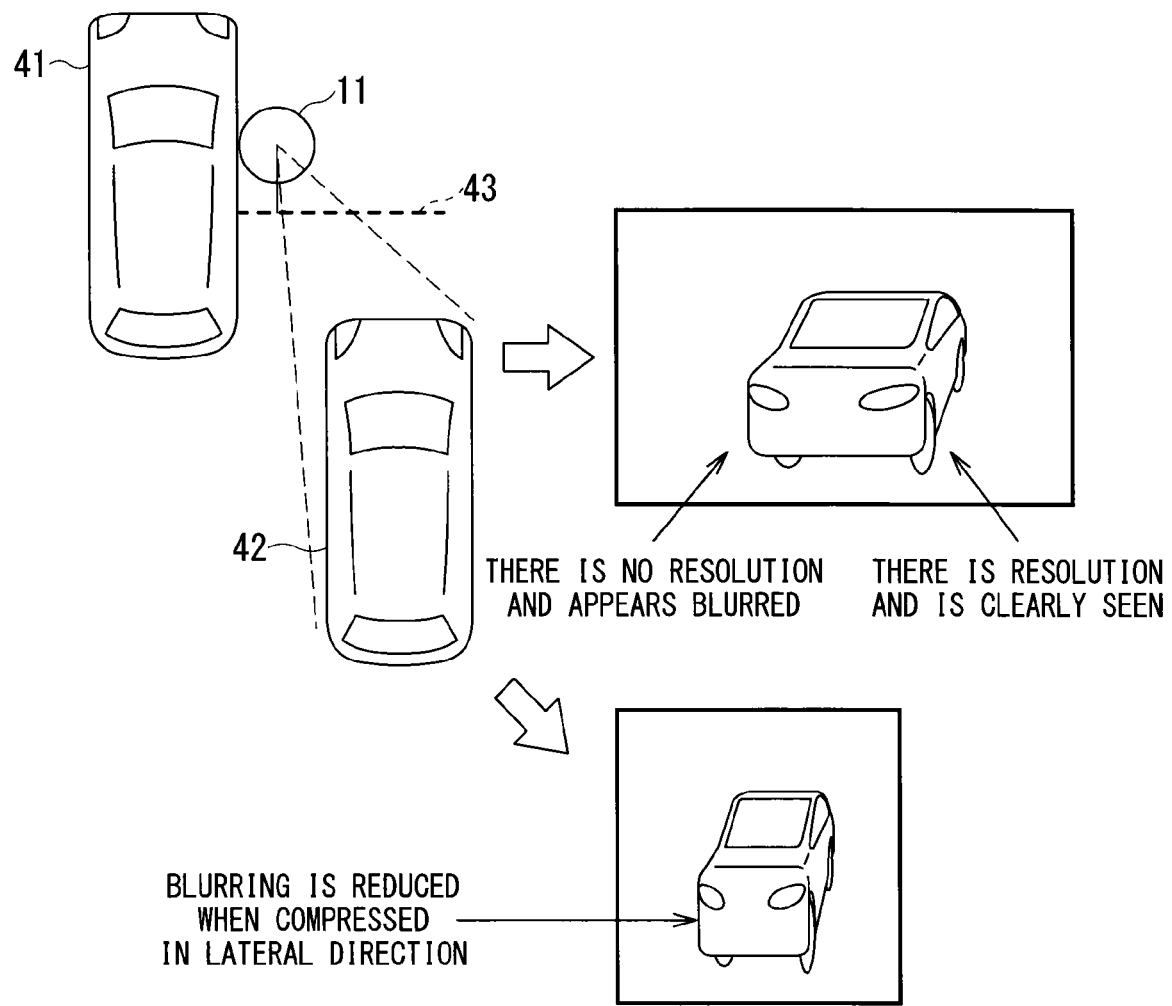
FIG. 13 is an explanatory diagram illustrating a first modification example of processing to generate a processed image.

FIG. 13 is an explanatory diagram illustrating a first modification example of processing to generate a processed image.

In a case where another vehicle is close to the own vehicle 41 and is running parallel thereto, in image data of a picked-up image that was picked up by the camera 11 that has a wide viewing angle, image data with respect to the lateral direction of the other vehicle is compressed. Consequently, if the image is expanded in the lateral direction based on the image data so as to obtain a normal aspect ratio, the resolution will deteriorate (see upper right section in FIG. 13). Therefore, the dictionary generation unit 21 may generate a dictionary using images that are compressed in the lateral direction relative to the normal aspect ratio, and the processed image generation unit 22 may generate a processed image that is compressed in the lateral direction relative to the normal aspect ratio (see lower right section in FIG. 13). In this case, since the resolution ratio with respect to the image data that the camera 11 outputs can be maintained in the processed image, the accuracy of detecting the detection target object 42 can be improved. The same also applies in a case where a side surface of the other vehicle is adopted as the detection target surface.

Further, since the compression ratio of the detection target object 42 in the image data of the picked-up image differs according to the position of the detection target object 42 relative to the vehicle 41 on which the camera 11 is mounted, a ratio between an image and the dictionary may also be changed according to the position.

In the case of the camera 11 that picks up images by an interlacing method, if there is a movement of the detection target object 42, the detection target object 42 will appear as strip shapes and either of odd-numbered rows and even-numbered rows will be acquired, whereby the image of the image data itself will become horizontally long. In view of this fact, the processed image generation unit 22 may generate an image in which the longitudinal direction is compressed as the processed image, or the dictionary generation unit 21 may use images in which the length in the longitudinal direction is compressed when creating a dictionary.

Further, if it is known that there is a difference with respect to the aspect ratio of the original image that is ascribable to the aspect ratio of the camera 11 or to a fisheye camera or the like, a processed image may be created by changing the aspect ratio in accordance therewith, and a dictionary may be created in accordance therewith. For example, in the case of a fish-eye image having a horizontally long elliptical shape, a configuration is adopted so that the length is not unreasonably extended in order to achieve a ratio of 1:1 between the length and width when performing distortion correction for converting fish-eye image to a flat surface. Not extending the length makes it possible to maintain the resolution ratio in the longitudinal direction of the image, and edges in the image can be made vivid.

According to the first modification example of the processed image generation, since the resolution ratio of image data that the camera 11 outputs can be maintained in the processed image, the accuracy of detecting the detection target object 42 can be improved.

(Second Modification Example of Processed Image Generation)

Figure 14:
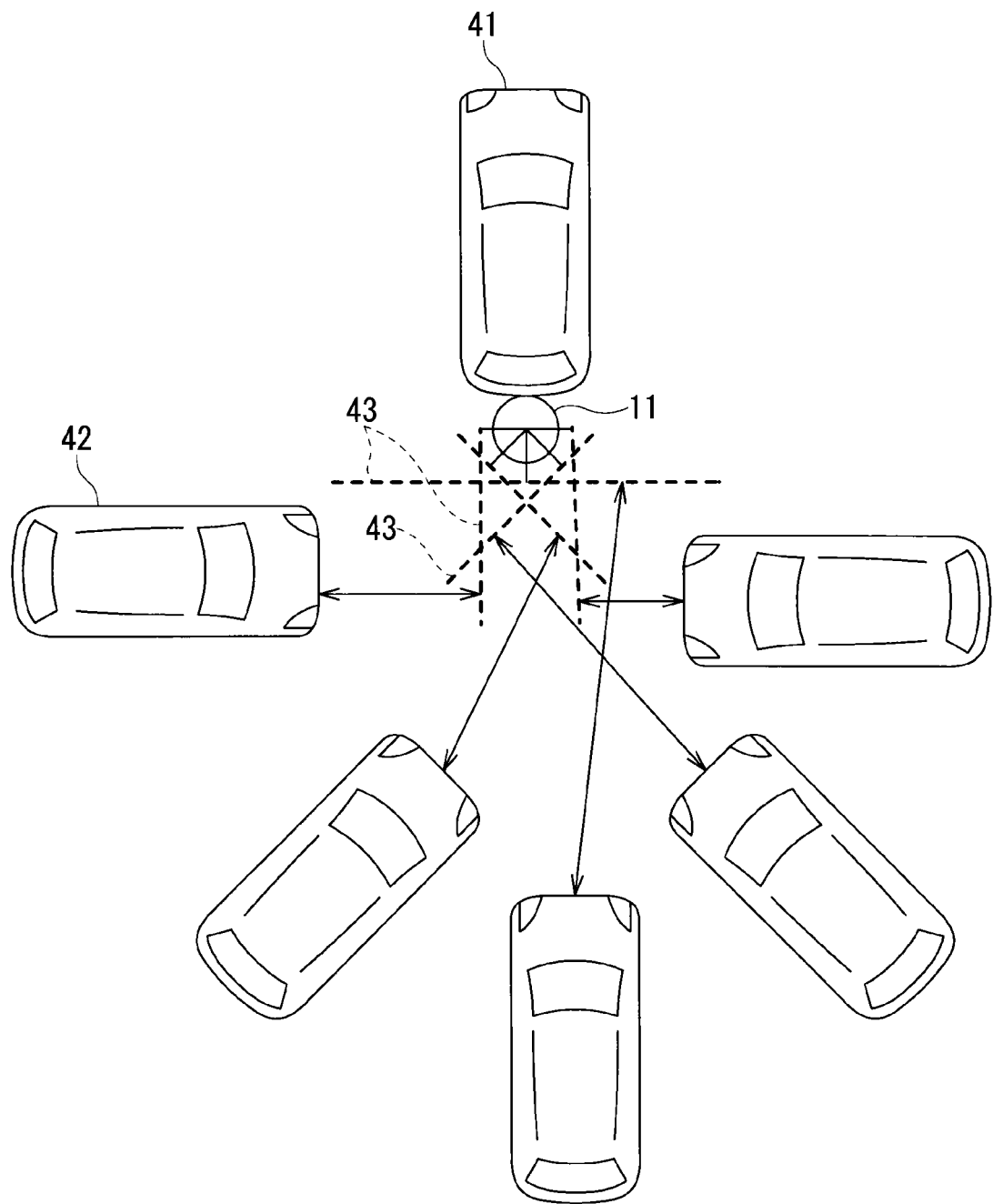
FIG. 14 is an explanatory diagram illustrating a second modification example of processing for generating a processed image.

FIG. 14 is an explanatory diagram illustrating a second modification example of processing for generating a processed image.

A case where another vehicle approaches the own vehicle 41 is not limited to a case where another vehicle overtakes the own vehicle 41, and cases may be supposed in which another vehicle approaches the own vehicle 41 from various directions. In such cases, if the camera 11 having a wide viewing angle is provided at a rear part of the own vehicle 41, it is favorable for the processed image generation unit 22 to generate a plurality of processed images in which each of a plurality of the visual axes 40 is taken as the normal-line direction based on an image picked up by the camera 11. More specifically, the processed image generation unit 22 sets the plane of projection 43 in a plurality of directions, and creates processed images that correspond to each plane of projection 43, respectively. At such time, in the case of adopting the same detection target surface on each plane of projection 43 as a detection object, a single dictionary can be shared for all the processed images.

By using processed images that correspond to the plurality of planes of projection 43, respectively, the detection unit 23 can stably detect the detection target object 42 even in a case where a vehicle intersects with the plane of projection 43 at a position that deviates from the camera 11 (a case where the detection target object 42 moves at a position that is separated from the image center on the processed image).

It is favorable to make angles (deviation angles) formed between adjacent planes of projection 43 an angle (for example, 45 degrees) such that the detection target object 42 that moves at an overlapping angle (overlapping region) can be stably detected on any of the adjacent planes of projection 43. Further, if the dictionary generation unit 21 previously creates a dictionary which is allowed to also learn images of a state in which the visual axis 40 and the normal-line direction of the detection target surface are inclined to a certain extent from a parallel state, an angle formed between the adjacent planes of projection 43 can be widened (for example, to an angle of 70 degrees) since the range that can be covered by a single processed image can be extended.

In addition, if the dictionary generation unit 21 previously creates a dictionary which is allowed to learn only images of a state in which the visual axis 40 and the normal-line direction of the detection target surface are not inclined very much from a parallel state, and an angle formed between the adjacent planes of projection 43 is narrowed (for example, to an angle of 30 degrees), although the range that can be covered by a single processed image narrows, highly accurate detection can be performed.

The possibility that the detection target object 42 will protrude from the processed image increases as the detection target object 42 approaches the vehicle 41 in which the image processing apparatus 10 is mounted. Therefore, a configuration may be adopted so as to increase an overlapping region between adjacent processed images in accordance with the proximity to the vehicle 41 of the detection target object 42. The detection unit 23 then treats each of the processed images as a processed image, and performs processing to detect the detection target object 42. In this case a situation is conceivable in which the detection target object 42 is simultaneously detected from a plurality of processed images, and therefore the HOG result judgment unit 32 may extract a result in which the likelihood is highest or a result detected in a processed image corresponding to the detection target object 42 that is closest to the own vehicle 41 (that is, a result in which the degree of risk is considered highest) as the valid result.

Figure 15:
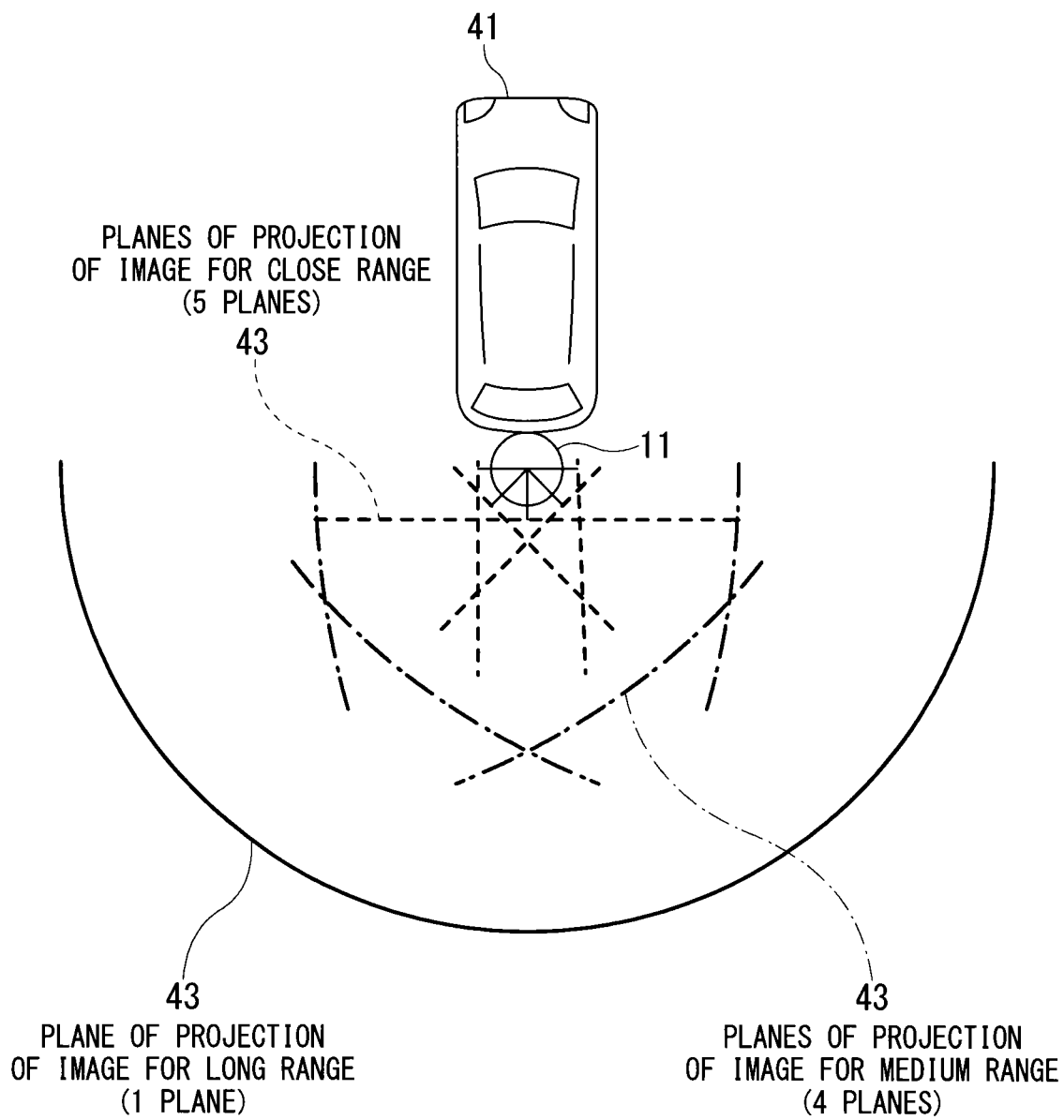
FIG. 15 is an explanatory drawing illustrating an example of a case where a processed image is curved according to a distance in the second modification example of processing to generate a processed image.

FIG. 15 is an explanatory drawing illustrating an example of a case where a processed image is curved according to a distance in the second modification example of processing to generate a processed image.

In a case where a fish-eye lens is mounted on the camera 11, even if a processed image corresponding to a position that is far from the own vehicle 41 (a processed image having a high rate of magnification) has a spherical or a circular shape, there is little distortion of an object in the processed image. Therefore, as shown in FIG. 15, the number of processed images may be reduced by curving a processed image corresponding to a position that is far from the own vehicle 41 (a processed image having a high rate of magnification) into a spherical or circular shape such that the curvature of its surface progressively increases as the distance from the own vehicle 41 increases. In this case, it is assumed that the closer that the detection target object 42 is to the vehicle 41, the more that the detection target object 42 will travel towards a position that angularly deviates from the camera 11, and therefore the number of processed images in which the image is taken as a flat surface may be increased in accordance with the degree of proximity of a position to which the processed image corresponds to the own vehicle 41.

In FIG. 15, an example is illustrate of a case in which, for the image pyramid 50, five planes of projection 43 are prepared for images for close range, four planes of projection 43 are prepared for images for medium range, and one plane of projection 43 is prepared for images for long range.

According to the second modification example of the processed image generation, the image processing apparatus 10 can stably detect the detection target object 42 that approaches the own vehicle 41 from various directions. Further, by curving a processed image corresponding to a position that is far from the own vehicle 41 (a processed image having a high rate of magnification) into a spherical or circular shape to an extent that progressively increases as the distance from the own vehicle 41 increases, the number of processed images that it is necessary to generate can be reduced.

(Third Modification Example of Processed Image Generation)

Figure 16:
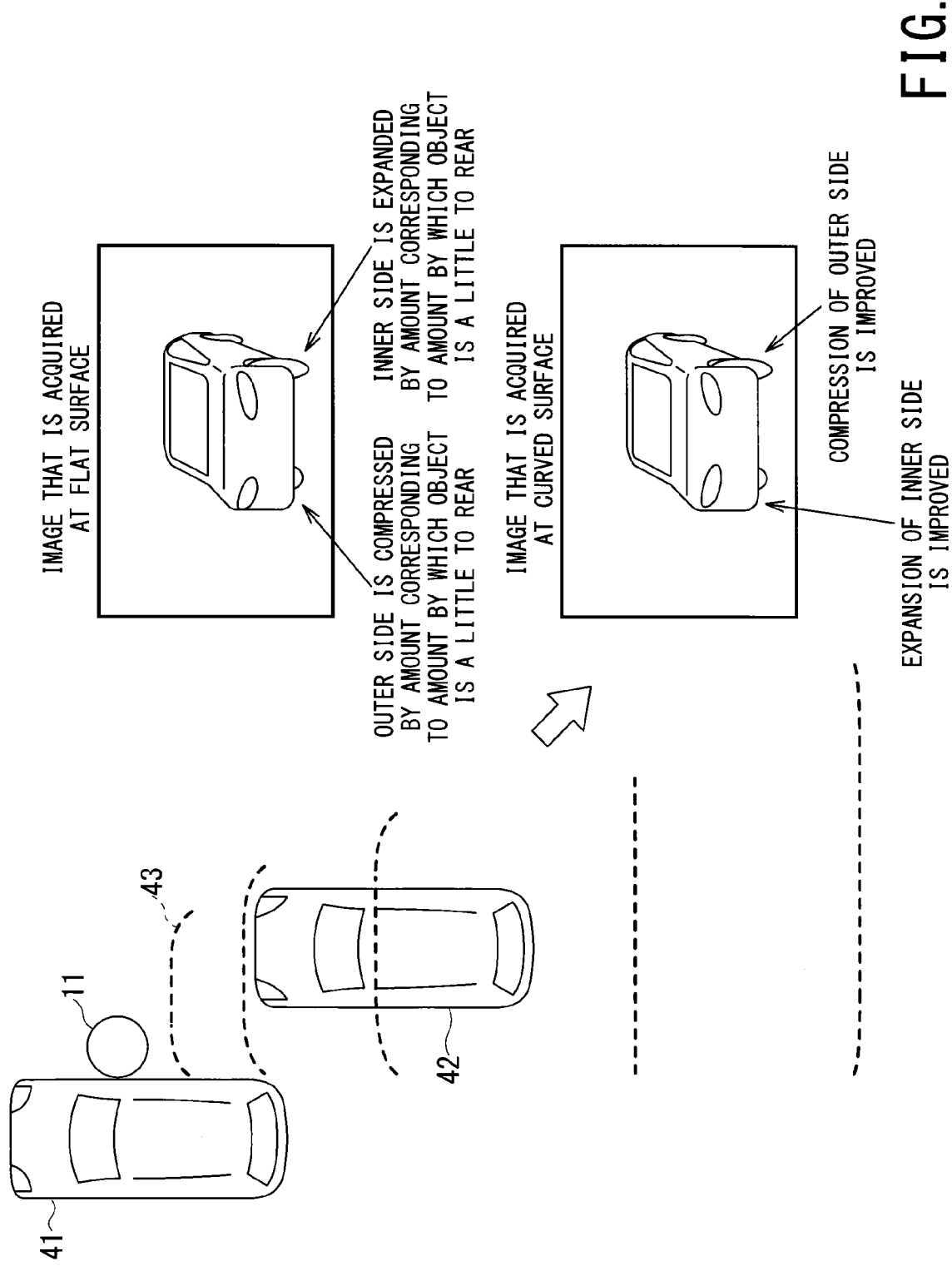
FIG. 16 is an explanatory diagram illustrating a third modification example of processing to generate a processed image.

FIG. 16 is an explanatory diagram illustrating a third modification example of processing to generate a processed image.

In a case where a detection target surface is not a flat surface and the degree of curvature of the detection target surface is known in advance, a processed image may be curved by curving the plane of projection 43 in accordance with the shape of the detection target surface of the detection target object 42.

For example, in a case where the detection target surface is the front surface of an automobile as shown in FIG. 16, as viewed from the own vehicle 41, the left and right edges of the detection target surface are positioned more to the back than the vicinity of the center of the detection target surface. In this case, both ends of the plane of projection 43 may be curved towards the back as shown in FIG. 16. In this case, a light portion of another vehicle that is on the farther side from the own vehicle 41 is enlarged and a light portion that is on the nearer side to the own vehicle 41 is compressed, and thus the bilaterally symmetrical can be easily seen and stable detection is facilitated (see lower right section in FIG. 16). The same applies with respect to the longitudinal direction of the detection target surface also. In the case of curving the plane of projection 43 according to the curvature of the detection target surface, it is favorable to previously create a dictionary that contains images that were curved in a similar manner.

Further, curvature of the detection target object 42 that is at a position that is far from the vehicle 41 becomes progressively less conspicuous as the detection target object 42 approaches the vehicle 41. Therefore, a configuration may be adopted so that, the further that the position which the processed image corresponds to is from the own vehicle 41 (the higher the rate of magnification of the processed image), the more that the degree of curvature with respect to the detection target surface is decreased to form a planar image or a flat (not curved according to the curvature of the detection target surface but simply curved) image such as a circle or a sphere. Furthermore, depending on the detection target object 42, there are cases in which the detection target surface (for example, the front surface of an automobile) has various surfaces from a completely flat surface to a curved surface. Hence, processing may be performed that combines the use of a processed image in which the relevant surface is not curved according to the curvature of the detection target surface and remains a planar or flat surface.

Furthermore, in the case of changing the degree of curvature of a processed image according to the distance from the own vehicle 41, a processed image that is generated with respect to a current frame image may be curved in a manner that takes into account a position relative to the own vehicle 41 of the detection target object 42 obtained in the previous frame image. Further, for example, it is favorable to use averages relating to shapes of automobiles that are commercially available when deciding the manner in which to curve images. A dictionary that contains images acquired in that state may also be created.

According to the third modification example of the processed image generation, since the plane of projection 43 can be set in accordance with the shape of the detection target surface of the detection target object 42, the detection target object 42 can be detected with greater stability and accuracy.

(Fourth Modification Example of Processed Image Generation)

Figure 17:
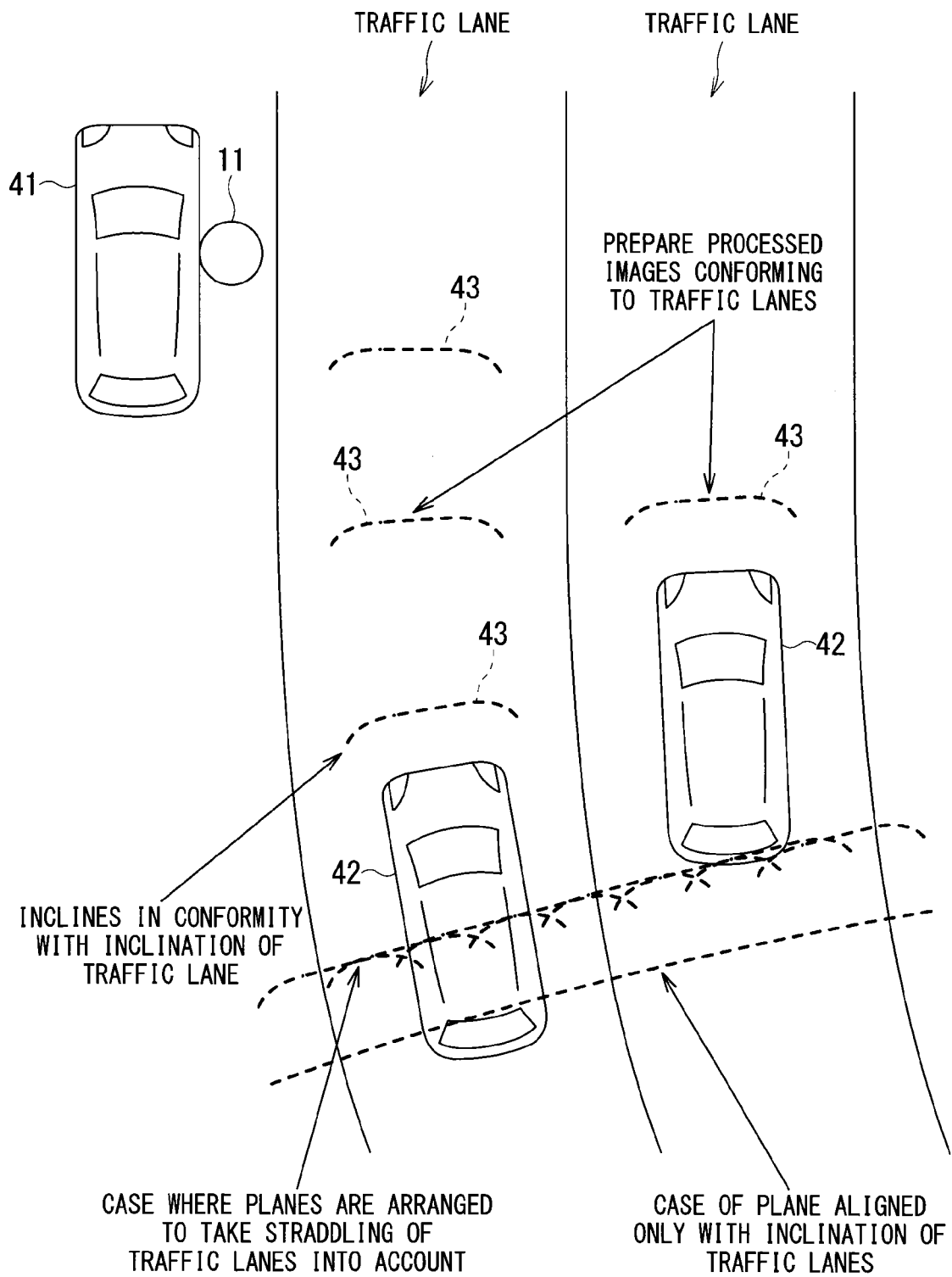
FIG. 17 is an explanatory diagram illustrating a fourth modification example of processing to generate a processed image.

FIG. 17 is an explanatory diagram illustrating a fourth modification example of processing to generate a processed image.

In the case of detecting vehicles running alongside the own vehicle 41 with a side camera (camera 11 provided in the vicinity of a side-view mirror) when there is a plurality of traffic lanes, the inclination or position of the plane of projection 43 of a processed image may be changes in consideration of a curve of the traffic lanes or the positions of the traffic lanes. Further, to facilitate detection of a vehicle that straddles traffic lanes, a configuration may be adopted in which the plane of projections 43 are arranged so that a part of the plane of projections 43 overlap with each other while causing the planes of projection 43 to deviate a little with respect to each other.

According to the fourth modification example of the processed image generation, vehicles running alongside the own vehicle 41 can be detected in a case where there is a plurality of traffic lanes. Further, since the depth ratio becomes relatively smaller as the distance from the own vehicle 41 of the position to which the image corresponds increases, the plane of projection 43 may be widened while reducing the number of the planes of projection 43 as the distance from the own vehicle 41 of the position to which the relevant plane of projection 43 corresponds increases. In this case, the overall processing load can be decreased since the number of processed images that are generated can be reduced.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the scope of the invention as defined by the appended claims. The accompanying claims and their equivalents are intended to cover such forms or modifications as would fall within the scope of the invention as defined by the appended claims.

For example, in a case where a direction in which a vehicle moves or a position thereof is decided in the case of detecting a vehicle using a rear camera (camera 11 provided at the rear of the vehicle) or the like, such as when in a parking lot, a processed image may be created using the plane of projection 43 that is in accordance with the aforementioned direction or position. In this case, because only a processed image that corresponds to a plane of projection 43 in a fixed direction is taken as a processing object, the processing load can be significantly reduced and thus high-speed detection is enabled.

In a case where the detection target surface is not a completely flat surface, the detection target object 42 will appear progressively distorted as that distance by which the detection target object 42 is separated from the center of the picked-up image increases even in a state where the visual axis 40 and the normal-line direction of the detection target surface have been aligned. Therefore, the dictionary generation unit 21 may generate dictionaries for every predetermined distance (for example, half of the focal distance) from the center of an image and for each of the separating directions (for example, for every 45 degrees). The detection target object 42 can be detected with greater accuracy when using these dictionaries.

For example, a case of dividing processing area into left and right will now be described. In a case where another vehicle intersects at a position that deviates relative to the camera 11, and the direction thereof is decided, the distortion with respect to compression/enlargement of the left and right sides of the vehicle will be biased to one side. These kind of cases are such as a case of a difference between a left camera and a right camera when detecting a vehicle that runs alongside the own vehicle, or the case of a difference between intersecting from the right and intersecting from the left when using a rear camera. For example, in a case where there is a plurality of traffic lanes, the manner of in which the vehicle is distorted will be opposite between a case of overtaking on the right side and a case of overtaking on the left side. Further, in the case of detecting a vehicle that intersects with the rear of the vehicle using a rear camera also, the manner of distorting will be opposite depending on whether the vehicle intersects on the right side or the left side. In this case, the detection accuracy can be further improved by generating dictionaries that correspond to each camera installation position, respectively.

Furthermore, in a case where depths are different even though lateral distances are the same, the degree of distortion will change since an angle that is formed between the visual axis 40 and a straight line linking the detection target object 42 and the focal point of the camera 11 will change. In this case, the detection accuracy can be further improved by creating a corresponding dictionary for each angle.

Further, a picked-up image that the image processing apparatus 10 utilizes may be not only an image that was picked up by the camera 11 provided in the vehicle, but may also be an image that was picked up by a common periphery monitoring camera such as a camera installed on a street light.

The invention claimed is:

1. An image processing apparatus comprising:
a dictionary generation unit configured to generate a dictionary as a single dictionary in advance using a plurality of images of a detection target object picked up in advance by a camera, the camera being provided on a vehicle and picking up an image around the vehicle with a wide viewing angle, the plurality of images being obtained by arranging the detection target object at a corresponding plurality of positions in a predetermined range within an image-pickup range of the camera so as to make a predetermined visual axis of the camera and a normal-line direction of a detection target surface of the detection target object parallel to each other, and the plurality of images being obtained by picking up each of the plurality of images by the camera at the corresponding plurality of positions;
a processed image generation unit configured to generate a processed image having the predetermined visual axis as a normal-line direction, based on an image picked up by the camera after generation of the dictionary; and
a detection unit configured to detect the detection target object included in the processed image by determining a feature value using the dictionary.

2. The apparatus according to claim 1, wherein:
the detection unit detects the detection target object included in the processed image using the dictionary, based on a HOG feature value.

3. The apparatus according to claim 2, wherein:
the processed image generation unit generates a plurality of processed images by scaling the image picked up by the camera so as to cause the plurality of processed images to have a different scaling factor to each other while each of the plurality of processed images having the predetermined visual axis as a normal-line direction.

4. The apparatus according to claim 1, wherein:
the dictionary generation unit previously generates a plurality of dictionaries for a corresponding plurality of visual axes of the camera;
the processed image generation unit generates a plurality of processed images in which the corresponding plurality of visual axes is taken as a normal-line direction, based on the image picked up by the camera; and
the detection unit detects the detection target object included in each of the plurality of processed images by determining a predetermined feature value using a dictionary corresponding to the each of the plurality of processed images.

5. The apparatus according to claim 3, wherein:
a fish-eye lens is mounted on the camera; and
the processed image generation unit generates the plurality of processed images such that the plurality of processed images curve in a progressively increasing manner in accordance with an extent to which the processed image has a large scaling factor and with respect to which a distance from the vehicle is far.

6. The apparatus according to claim 1, wherein:
the processed image generation unit curves each of the plurality of processed images according to a shape of the detection target surface of the detection target object.

7. The apparatus according to claim 1, further comprising:
a warning unit configured to, upon detection of the detection target object from the processed image by the detection unit, notify a driver of the vehicle of information regarding the detection target object that is detected by the detection unit using at least one of an audio output through a speaker of the vehicle, a buzzer output through the speaker of the vehicle, and a warning display on a display apparatus provided at a position recognizable to the driver.

8. An image processing method comprising:
generating a dictionary as a single dictionary in advance using a plurality of images of a detection target object picked up in advance by a camera, the camera being provided on a vehicle and picking up an image around the vehicle with a wide viewing angle, the plurality of images being obtained by arranging the detection target object at a corresponding plurality of positions in a predetermined range within an image-pickup range of the camera so as to make a predetermined visual axis of the camera and a normal-line direction of a detection target surface of the detection target object parallel to each other, and the plurality of images being obtained by picking up each of the plurality of images by the camera at the corresponding plurality of positions;
generating a processed image having the predetermined visual axis as a normal-line direction, based on an image picked up by the camera after generation of the dictionary; and
detecting the detection target object included in the processed image by determining a feature value using the dictionary.

9. A non-transitory computer readable medium having instructions stored therein which, when executed by a computer, causes the computer to execute the steps of the method according to claim 8.

* * * * *